United States Patent
Jung et al.

(10) Patent No.: US 12,001,619 B2
(45) Date of Patent: Jun. 4, 2024

(54) ELECTRONIC DEVICE FOR PERFORMING CORRECTION FOR STYLUS, AND OPERATION METHOD THEREFOR

(71) Applicant: Samsung Electronics Co., Ltd., Suwon-si (KR)

(72) Inventors: Inhyung Jung, Suwon-si (KR); Banghyun Kwon, Suwon-si (KR); Sangheon Kim, Suwon-si (KR); Hyunwoong Kwon, Suwon-si (KR); Jongwu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/587,786

(22) Filed: Jan. 28, 2022

(65) Prior Publication Data

US 2022/0147161 A1 May 12, 2022

Related U.S. Application Data

(63) Continuation of application No. PCT/KR2020/010049, filed on Jul. 30, 2020.

(30) Foreign Application Priority Data

Jul. 30, 2019 (KR) .................. 10-2019-0092186

(51) Int. Cl.
  *G06F 3/038* (2013.01)
  *G06F 3/0354* (2013.01)
(52) U.S. Cl.
  CPC ........ *G06F 3/0383* (2013.01); *G06F 3/03545* (2013.01)
(58) Field of Classification Search
  CPC .. G06F 3/0383; G06F 3/03545; G06F 1/1626; G06F 2200/1632; G06F 3/038
  See application file for complete search history.

(56) References Cited

U.S. PATENT DOCUMENTS

| | | |
|---|---|---|
| 9,534,924 B2 | 1/2017 | Ahuja et al. |
| 10,198,092 B2 | 2/2019 | Park et al. |

(Continued)

FOREIGN PATENT DOCUMENTS

| | | |
|---|---|---|
| CN | 110007784 A | 7/2019 |
| KR | 10-0764526 B1 | 10/2007 |

(Continued)

OTHER PUBLICATIONS

International Search Report and Written Opinion of the International Searching Authority dated Nov. 20, 2020, in connection with International Application No. PCT/KR2020/010049, 9 pages.

(Continued)

*Primary Examiner* — Bryan Earles

(57) ABSTRACT

An electronic device according to an embodiment may include a first sensor, a communication circuit, a processor operatively coupled to the first sensor and the communication circuit, and a memory operatively coupled to the processor. The memory may store instructions that, when executed by the processor, cause the processor to: determine whether calibration is required for a second sensor of a stylus pen, based on a specified condition; identify that the stylus pen is aligned to a specified position of the electronic device; in response to identifying that the stylus pen is aligned to the specified position of the electronic device and determining that the calibration is required, collect situation information by using the first sensor; and transmit a calibration command to the stylus pen through the communication circuit, based on the situation information.

8 Claims, 14 Drawing Sheets

(56) References Cited

U.S. PATENT DOCUMENTS

| | | | |
|---|---|---|---|
| 10,474,354 B2 * | 11/2019 | Lin | G06F 3/0412 |
| 11,392,226 B2 | 7/2022 | Zou et al. | |
| 2002/0181744 A1 | 12/2002 | Vablais et al. | |
| 2002/0190823 A1 * | 12/2002 | Yap | G06F 3/03545 |
| | | | 335/205 |
| 2004/0007064 A1 | 1/2004 | Sakaguchi | |
| 2010/0051356 A1 * | 3/2010 | Stern | G06F 3/0442 |
| | | | 178/19.04 |
| 2011/0291998 A1 | 12/2011 | Adams et al. | |
| 2016/0070391 A1 * | 3/2016 | Zhang | G06F 3/0442 |
| | | | 345/179 |
| 2017/0168597 A1 * | 6/2017 | Nicholson | G06F 3/0418 |
| 2017/0255328 A1 * | 9/2017 | Zyskind | G06F 3/0383 |
| 2018/0232101 A1 * | 8/2018 | Fotopoulos | G06F 3/0446 |
| 2022/0137729 A1 * | 5/2022 | Zou | G06F 3/04162 |
| | | | 345/179 |

FOREIGN PATENT DOCUMENTS

| | | |
|---|---|---|
| KR | 10-0844909 B1 | 7/2008 |
| KR | 10-2018-0014461 A | 2/2018 |
| KR | 10-2019-0010080 A | 1/2019 |

OTHER PUBLICATIONS

Office Action issued Apr. 15, 2024, in connection with Korean Patent Application No. 10-2019-0092186, 15 pages.

\* cited by examiner

ELECTRONIC DEVICE FOR PERFORMING CORRECTION FOR STYLUS, AND OPERATION METHOD THEREFOR

CROSS-REFERENCE TO RELATED APPLICATIONS

This application is a Bypass Continuation of International Application No. PCT/KR2020/010049, filed Jul. 30, 2020, which claims priority to Korean Patent Application No. 10-2019-0092186, filed Jul. 30, 2019, the disclosures of which are herein incorporated by reference in their entirety.

BACKGROUND

1. Field

The disclosure relates to an electronic device which performs correction for a stylus, and an operation method therefor.

2. Description of Related Art

In order to provide a user-friendly input scheme, there is ongoing development on an electronic device interworking with a pen-type input tool such as a digital pen and a stylus. The pen-type input tool may have a sensor to provide a user with various input schemes using the pen-type input tool.

SUMMARY

When a pen-type input tool interworking with the electronic device is used at a location spaced apart from the electronic device, a precise position, movement trajectory, and movement speed of the pen-type input tool shall be transferred to the electronic device. When the precise position, movement trajectory, and movement speed of the pen-type input tool are not transferred to the electronic device, an output of the electronic device with respect to a user's input using the pen-type input tool may be different from a result intended by the user.

When the user uses the pen-type input tool, an erroneous operation may occur in a sensor of the pen-type input tool. Accordingly, there may be a need for a method which allows the pen-type input tool to precisely measure the position, movement trajectory, and movement speed thereof.

Technical problems to be achieved in the disclosure are not limited to the technical problems mentioned above, and other technical problems not mentioned herein can be clearly understood by those skilled in the art to which the disclosure pertains from the following descriptions.

An electronic device according to an embodiment may include a first sensor, a communication circuit, a processor operatively coupled to the first sensor and the communication circuit, and a memory operatively coupled to the processor. The memory may store instructions that, when executed by the processor, cause the processor to determine whether calibration is required for a second sensor of a stylus pen, based on a specified condition, identify that the stylus pen is aligned to a specified position of the electronic device, collect situation information by using the first sensor upon identifying that the stylus pen is aligned to the specified position of the electronic device and upon determining that the calibration is required, and transmit a calibration command to the stylus pen through the communication circuit, based on the situation information.

A method of operating an electronic device according to an embodiment may include determining whether calibration is required for a second sensor of a stylus pen, based on a specified condition, identifying that the stylus pen is aligned to a specified position of the electronic device, collecting situation information by using a first sensor of the electronic device upon identifying that the stylus pen is aligned to the specified position of the electronic device and upon determining that the calibration is required, and transmitting a calibration command to the stylus pen, based on the situation information.

In an electronic device and an operation method thereof according to an embodiment, a calibration operation for a pen-type input tool is performed when a specified condition is satisfied, so that the pen-type input tool is capable of precisely measuring a position, movement trajectory, and movement speed thereof.

Advantageous effects that can be obtained in the disclosure are not limited to the aforementioned advantageous effects, and other unmentioned advantageous effects can be clearly understood by one of ordinary skill in the art to which the disclosure pertains from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to the description of the drawings, similar reference numerals may be used to refer to similar or related elements.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
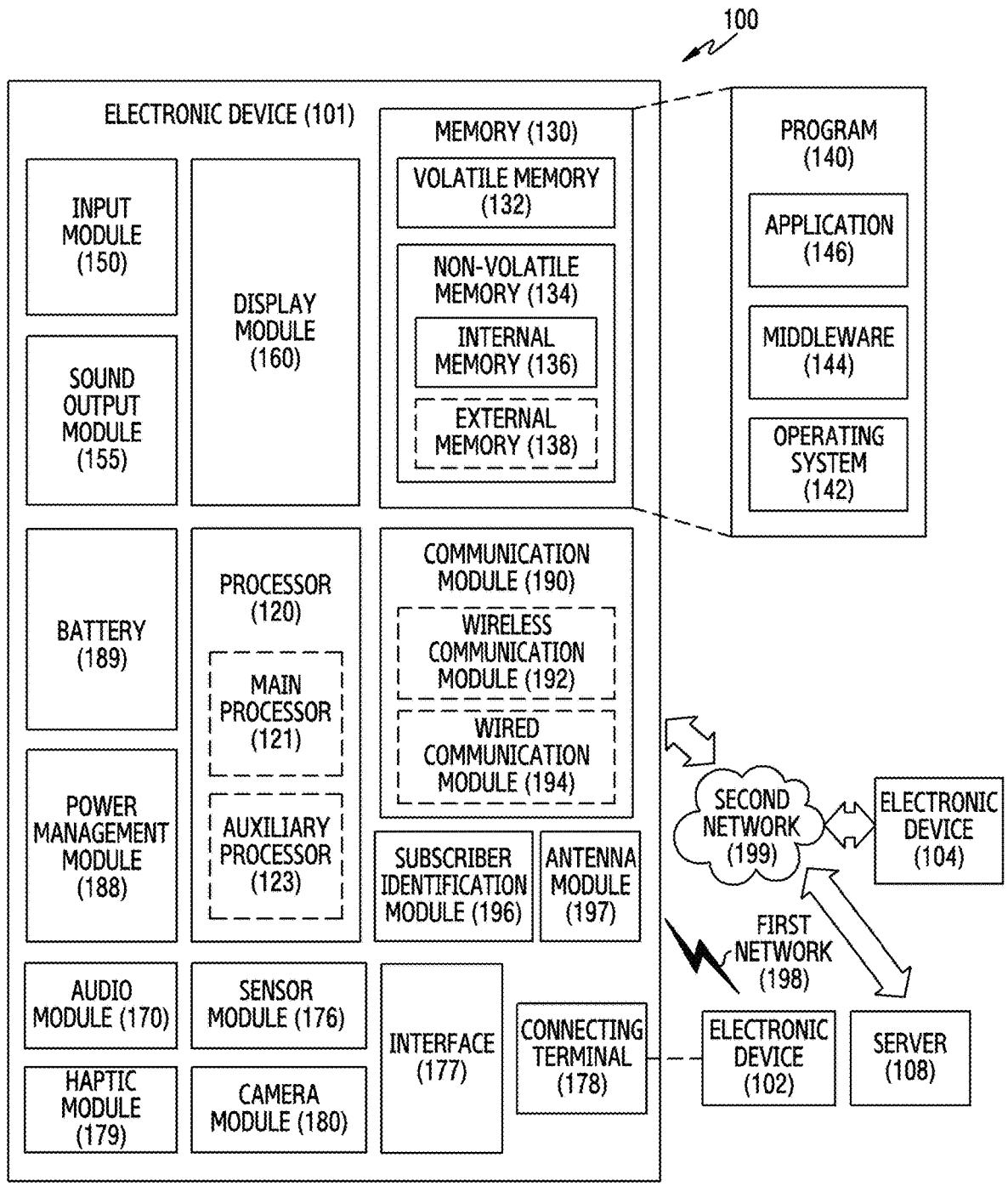
FIG. 1 illustrates a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute the instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as the functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
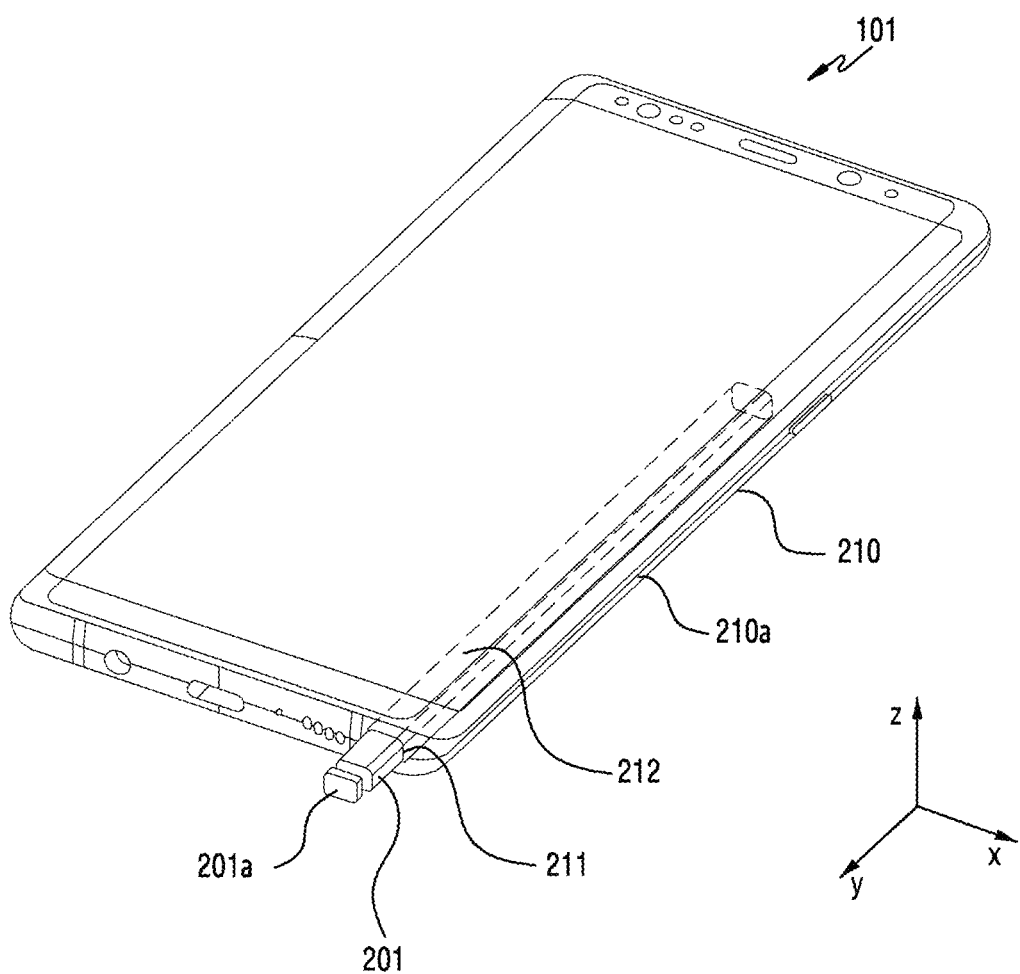
FIG. 2 illustrates a perspective view of an electronic device including a stylus pen, according to an embodiment.

FIG. 2 is a perspective view of an electronic device 101 including a stylus pen 201 (e.g., the electronic device 102 of FIG. 1), according to an embodiment. According to an embodiment, the stylus pen 201 in the disclosure may correspond to the input device 150 of FIG. 1.

Referring to FIG. 2, the electronic device 101 of an embodiment may include a structure of FIG. 1, and may include a structure capable of inserting the stylus pen 201. The electronic device 101 may include a housing 210, and a hole 211 may be included in a portion of the housing 210, for example, in a portion of a lateral face 210a. The electronic device 101 may include a first inner space 212 which is an accommodation space coupled to the hole 211, and the stylus pen 201 may be inserted into the first inner space 212. According to the illustrated embodiment, the stylus pen 201 may include a first button 201a which may be pressed at one end so that the stylus pen 201 is easily removed from the first inner space 212 of the electronic device 101. When the first button 201a is pressed, since a repulsion mechanism (e.g., a repulsion mechanism based on at least one elastic member (e.g., a spring)) configured in association with the first button 201a operates, the stylus pen 201 may be removed from the first inner space 212.

Figure 3A:
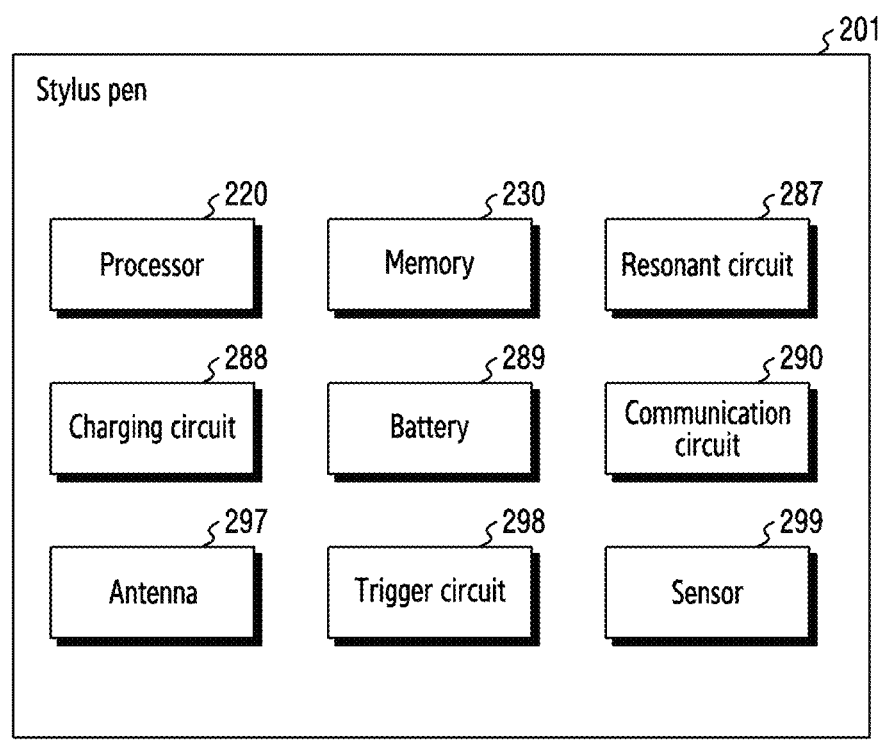
FIG. 3A illustrates a block diagram illustrating a stylus pen, according to an embodiment.

FIG. 3A is a block diagram illustrating a stylus pen (e.g., the stylus pen 201 of FIG. 2), according to an embodiment.

Referring to FIG. 3A, the stylus pen 201 according to an embodiment may include a processor 220, a memory 230, a resonant circuit 287, a charging circuit 288, a battery 289, a communication circuit 290, an antenna 297, a trigger circuit 298, and/or a sensor 299. In some embodiments, the processor 220 of the stylus pen 201, at least part of the resonant circuit 287, and/or at least part of the communication circuit 290 may be constructed on a Printed Circuit Board (PCB) or in the form of a chip. The processor 220, the resonant circuit 287, and/or the communication circuit 290 may be electrically coupled to the memory 230, the charging circuit 288, the battery 289, the antenna 297, the trigger circuit 298, and/or the sensor 299.

According to an embodiment, the processor 220 may include a generic processor configured to execute a customized hardware module or software (e.g., an application program). The processor 220 may include a software element (program) or a hardware component (function) including at least one of various sensors provided in the stylus pen 201, a data measurement module, an input/output interface, a module for managing a state or environment of the stylus pen 201, and a communication module. The processor 220 may include, for example, one of or a combination of two or more of hardware, software, and firmware. According to an embodiment, the processor 220 may be configured to transmit information indicating a pressed state of a button (e.g., the button 337), sensing information obtained by the sensor 299, and/or information (e.g., information related to a position of the stylus pen 201) calculated based on the sensing information to the electronic device 101 through the communication circuit 290.

The resonant circuit 287 according to an embodiment may resonate based on an electromagnetic field signal generated from a digitizer (e.g., the display device 160) of the electronic device 101, and may radiate an Electro-Magnetic Resonance (EMR) input signal (or a magnetic field) depending on the resonance. The electronic device 101 may identify a position of the stylus pen 201 on the electron device 101 by using the EMR input signal. For example, the electronic device 101 may identify the position of the stylus pen 201, based on a magnitude of induced electromotive force (e.g., output current) generated by the EMR input signal at each of a plurality of channels (e.g., a plurality of loop coils) in the digitizer. Meanwhile, although it is described above that the electronic device 101 and the stylus pen 201 operate based on an EMR scheme, this is for example purposes only, and thus the electronic device 101 may also generate a signal based on an electric field according to an Electrically Coupled Resonance (ECR) scheme. The resonant circuit of the stylus pen 201 may resonate based on the electric field. The electronic device 101 may identify an electric potential at a plurality of channels (e.g., electrodes) based on the resonance at the stylus pen 201, and may identify the position of the stylus pen 201, based on the electric potential. The stylus pen 201 may be implemented according to an Active ElectroStatic (AES) scheme, and there may be no limitation in a type of the implementation, which will be understood by those skilled in the art. In addition, the electronic device 101 may detect the stylus pen 201, based on a change in capacitance (self-capacitance or mutual capacitance) associated with at least one electrode of a touch panel. In this case, the resonant circuit may not be included in the stylus pen 201.

The memory 230 according to an embodiment may store information related to an operation of the stylus pen 201. For example, the information may include information for communication with the electronic device 101 and frequency information related to an input operation of the stylus pen 201. In addition, the memory 230 may store a program (or an application, an algorithm, or a processing loop) for calculating information (e.g., coordinate information and/or displacement information) regarding a position of the stylus pen 201 from sensing data of the sensor 299. The memory 230 may also store a communication stack of the communication circuit 290. According to an implementation, the communication circuit 290 and/or the processor 220 may include a dedicated memory.

The resonant circuit 287 according to an embodiment may include a coil (or an inductor) and/or a capacitor. The resonant circuit 287 may resonate based on an input electric field and/or magnetic field (e.g., an electric field and/or magnetic field generated from the digitizer of the electronic device 101). When the stylus pen 201 transmits a signal according to the EMR scheme, the stylus pen 201 may generate a signal including a resonant frequency, based on an electromagnetic field generated from an inductive panel of the electronic device 101. When the stylus pen 201 transmits a signal according to the AES scheme, the stylus pen 201 may generate a signal by using capacity coupling with the electronic device 101. When the stylus pen 201 transmits a signal according to the ECR scheme, the stylus pen 201 may generate a signal including a resonant frequency, based on an electromagnetic field generated from a capacitive device of the electronic device. According to an embodiment, the resonant circuit 287 may be used to change a frequency or strength of an electromagnetic field according to a user's manipulation state. For example, the resonant circuit 287 may provide various frequencies for recognizing a hovering input, a drawing input, a button input, or an erasing input. For example, the resonant circuit 287 may provide various resonant frequencies according to a connection combination of a plurality of capacitors, or may provide various resonant frequencies, based on a variable inductor and/or a variable capacitor.

When the charging circuit 288 according to an embodiment is coupled to the resonant circuit 287, based on a switching circuit, a resonant signal generated from the resonant circuit 287 may be rectified into a Direct Current (DC) signal and provided to the battery 289. According to an embodiment, the stylus pen 201 may use a voltage level of the DC signal detected from the charging circuit 288 to determine whether the stylus pen 201 is inserted to the electronic device 101. Alternatively, the stylus pen 201 may identify a pattern corresponding to a burst signal identified in the charging circuit 288 to identify whether the stylus pen 201 is inserted to the electronic device 101.

The battery 289 according to an embodiment may be configured to store power required for the operation of the stylus pen 201. The battery 289 may include, for example, a lithium-ion battery or a capacitor, and may be rechargeable or exchangeable. According to an embodiment, the battery 289 may be charged by using power (e.g., a DC signal (DC power)) provided from the charging circuit 288.

The communication circuit 290 according to an embodiment may be configured to perform a wireless communication function between the stylus pen 201 and a communication module of the electronic device. According to an embodiment, the communication circuit 290 may transmit state information, input information, and/or position-related information of the stylus pen 201 to the electronic device 101 by using a short-range communication scheme. For example, the communication circuit 290 may transmit, to the electronic device 101, direction information (e.g., motion sensor data) of the stylus pen 201 obtained through the trigger circuit 298, voice information input through a microphone, or information on remaining power of the battery 289. For example, the communication circuit 290 may transmit, to the electronic device 101, sensing data obtained from the sensor 299 and/or information related to a position of the stylus pen 201, identified based on the sensing data. For example, the communication circuit 290 may transmit, to the electronic device 101, information on a state of a button (e.g., the button 337) disposed to the stylus pen 201. As an example, the short-range communication scheme may include at least one of Bluetooth, Bluetooth Low Energy (BLE), NFC, and/or Wi-Fi direct, but a type thereof is not limited thereto.

The antenna 297 according to an embodiment may be used to transmit a signal or power to the outside (e.g., the electronic device 101) or to receive it from the outside. According to an embodiment, the stylus pen 201 may include the plurality of antennas 297, and may select at least one of the antennas 297 suitable for a communication scheme. Through the selected at least one antenna 297, the communication circuit 290 may exchange the signal or power with an external electronic device.

The trigger circuit 298 according to an embodiment may include at least one button or sensor circuit. According to an embodiment, the processor 220 may identify an input mechanism (e.g., touching or pressing) or type (e.g., an EMR button or a BLE button) of the button of the stylus pen 201. According to an embodiment, the trigger circuit 298 may transmit a trigger signal to the electronic device 101 by using an input signal of the button or a signal through the sensor 299.

The sensor 299 according to an embodiment may include an accelerometer, a gyro sensor, and/or a geomagnetic sensor. The accelerometer may sense information on linear movement of the stylus pen 201 and/or acceleration for three axes of the stylus pen 201. The gyro sensor may sense information related to rotation of the stylus pen 201. The geomagnetic sensor may sense information on a direction in an absolute coordinate system of the stylus pen 201. According to an embodiment, the sensor 299 may include not only a sensor for measuring movement but also a sensor capable of generating an electric signal or data value corresponding to an internal operating state or external environment state of the stylus pen 201, for example, at least one of a sensor for detecting battery remaining power, a pressure sensor, an optical sensor, a temperature sensor, and a biometric sensor. According to an embodiment, the processor 220 may transmit information obtained from the sensor 299 to the electronic device 101 through the communication circuit 290. Alternatively, based on the information obtained from the sensor 299, the processor 220 may transmit information related to a position of the stylus pen 201 (e.g., a coordinate of the stylus pen 201 and/or a displacement of the stylus pen 201) to the electronic device 101 through the communication circuit 290.

Figure 3B:
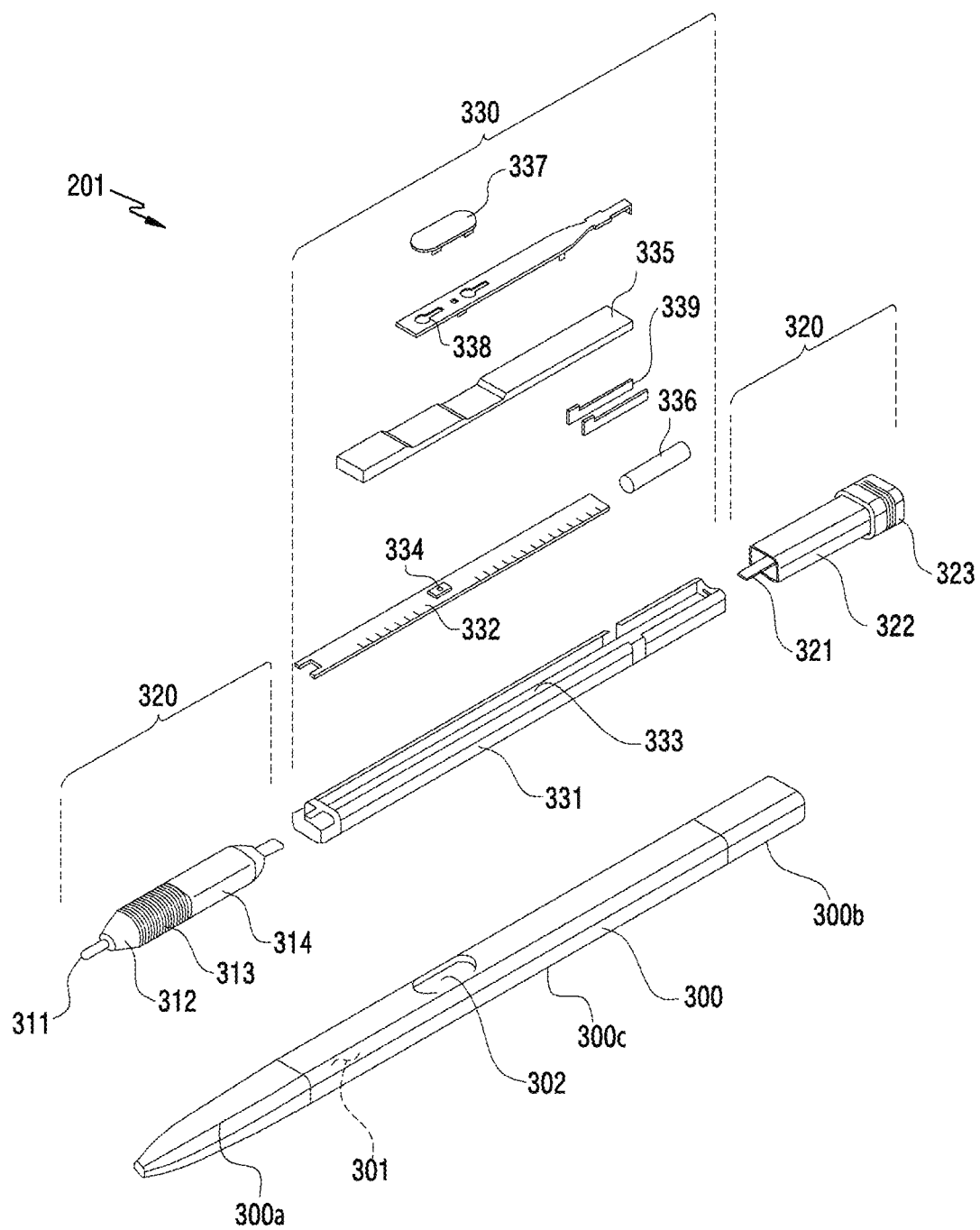
FIG. 3B illustrates an exploded perspective view of a stylus pen, according to an embodiment.

FIG. 3B is an exploded perspective view of a stylus pen (e.g., the stylus pen 201 of FIG. 2), according to an embodiment.

Referring to FIG. 3B, the stylus pen 201 may include a pen housing 300 constituting an exterior of the stylus pen 201 and an inner assembly inside the pen housing 300. In the illustrated embodiment, the inner assembly may be inserted into the pen housing 300 by performing an assembly operation one time, in a state where several components mounted inside the stylus pen 201 are combined together.

The pen housing 300 may have a shape elongated between a first end 300a and a second end 300b, and may include a second inner space 301 inside thereof. A cross-section of the pen housing 300 may have a shape of an ellipse consisting of a long axis and a short axis, and may be constructed in a cylindroid shape as a whole. The first inner space 212 of the electronic device 101 described above with reference to FIG. 2 may also be constructed to have an elliptical cross-section corresponding to a shape of the pen housing 300. According to an embodiment, the pen housing 300 may include, at least in part, a synthetic resin (e.g., plastic) and/or a metallic material (e.g., aluminum). According to an embodiment, the first end 300a of the pen housing 300 may be constructed of a synthetic resin material. Other embodiments may be applied to the material of the pen housing 300.

The inner assembly may have an elongated shape corresponding to the shape of the pen housing 300. The inner assembly may be roughly divided into three types of configurations along a lengthwise direction. For example, the inner assembly may include a coil portion 310 disposed at a position corresponding to the first end 300a of the pen housing 300, an ejection member 320 disposed at a position corresponding to the second end 300b of the pen housing 300, and a circuit board portion 330 disposed at a position corresponding to a body of the pen housing 300.

The coil portion 310 may include a pen tip 311, which is exposed to the outside of the first end 300a when the inner assembly is completely inserted to the pen housing 300, a packing ring 312, a coil 313, which is wound several times, and/or a pen pressure sensor 314 for obtaining a pressure change depending on pressure of the pen tip 311. The packing ring 312 may include epoxy, rubber, urethane, or silicone. The packing ring 312 may be disposed for waterproof and dustproof purposes, and may protect the coil portion 310 and the circuit board portion 330 against water permeation or dust. According to an embodiment, the coil 313 may produce a resonant frequency in a set frequency band (e.g., 500 KHz), and may be combined with at least one element (e.g., a capacitive capacitor) to adjust the resonant frequency produced by the coil 313 in a range of a specific level.

The ejection member 320 may include a configuration for removing the stylus pen 201 from a first inner space (e.g., the first inner space 212) of an electronic device (e.g., the electronic device 101 of FIG. 2). According to an embodiment, the ejection member 320 may include a shaft 321, an ejection body 322 disposed around the shaft 321 and constituting an overall exterior of the ejection member 320, and a button portion 323 (e.g., the first button 201a of FIG. 2). When the inner assembly is completely inserted to the pen housing 300, a portion including the first shaft 321 and ejection body 322 may be surrounded by the second end 300b of the pen housing 300, and at least part of the button portion 323 may be exposed to the outside of the second end 300b. A plurality of components (not shown), e.g., cam members or elastic members, may be disposed in the ejection body 322 to constitute a push-pull structure. In an embodiment, the button portion 323 may be substantially coupled to the shaft 321 to perform a linear reciprocating motion with respect to the ejection body 322. According to an embodiment, the button unit 323 may include a button having a hook structure so that a user is able to remove the stylus pen 201 by using a fingernail. According to an embodiment, the stylus pen 201 may provide another input mechanism by including a sensor for detecting the linear reciprocating motion of the shaft 321.

The circuit board portion 330 may include a PCB 332, a base 331 surrounding at least one face of the PCB 332, and an antenna. According to an embodiment, a substrate mounting portion 333 to which the PCB 332 is disposed may be constructed on an upper face of the base 331, and the PCB 332 may be fixed in a state of being mounted to the substrate mounting portion 333. According to an embodiment, the PCB 332 may include a first face and a second face. A switch 334 or a variable capacitance capacitor coupled to the coil 313 may be disposed on the first face. A charging circuit, a battery 336, or a communication circuit may be disposed on the second face. Herein, the first face and second face of the PCB 332 may mean laminated faces different from each other in a vertically laminated structure according to an embodiment, and may mean portions different from each other in a PCB disposed along a lengthwise direction of the PCB 332. The battery 336 may include an Electronic Double Layered Capacity (EDLC). The charging circuit may be located between the coil 313 and the battery, and may include a voltage detector circuitry and a rectifier. Herein, the battery 336 may not be necessarily disposed on the second face of the PCB 332. The battery 336 may be located variously according to various mounting structures of the PCB 332, and may be disposed at a position different from that shown in the figure.

The antenna may include an antenna structure 339 as shown in the example of FIG. 3B and/or an antenna embedded in the PCB 332. According to an embodiment, the switch 334 may be disposed on the PCB 332. The second button 337 disposed to the stylus pen 201 may be used to press the switch 334, and may be exposed to the outside through a lateral opening portion 302 of the pen housing 300. The second button 337 may be supported by a support member 338, and when there is no external force acting on the second button 337, the support member 338 may provide elastic restoration force so that the second button 337 is restored or maintained in a state of being disposed at a specific position. Meanwhile, the second button 337 may be implemented in any one of physical key, touch key, motion key, pressure key, and keyless manners, and there is no limitation in an implementation manner of the button.

The circuit board portion 330 may include, for example, a packing ring such as an O-ring. According to an embodiment, an O-ring made of an elastic body may be disposed at both ends of the base 331, so that a sealing structure is constructed between the base 331 and the pen housing 300. In some embodiments, the support member 338 may be closely in contact with an inner wall of the pen housing 300 around the lateral opening portion 302 to construct the sealing structure. For example, the circuit board portion 330 may include a waterproof and dustproof structure similar to the packing ring 312 of the coil portion 310 in at least one portion thereof.

The stylus pen 201 may include a battery mounting portion 333a in which the battery 336 is disposed on an upper face of the base 331. The battery 336 mountable to the battery mounting portion 333a may include, for example, a cylinder-type battery.

The stylus pen 201 may include a microphone (not shown) and/or a speaker. The microphone and/or the speaker may be coupled directly to the PCB 332 or coupled to an additional Flexible Printed Circuit Board (FPCB) (not shown) coupled to the PCB 332. According to an embodiment, the microphone and/or the speaker may be disposed at a position parallel to the second button 337 in a longitudinal direction of the stylus pen 201.

Figure 4:
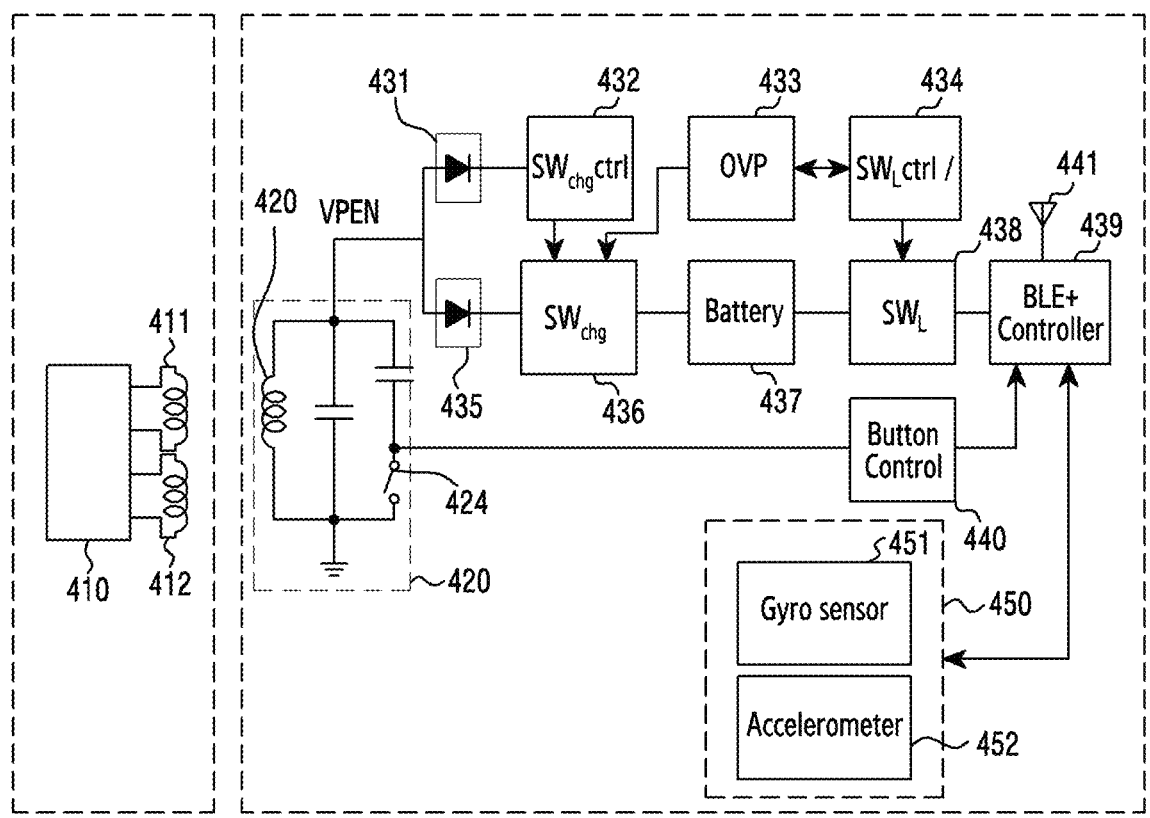
FIG. 4 illustrates a structure of an electronic device and stylus pen according to an embodiment.

FIG. 4 illustrates a structure of the electronic device 101 and stylus pen 201 according to an embodiment.

According to an embodiment, the electronic device 101 may include a pen controller 410. The pen controller 410 may include, for example, at least one amplifier coupled to one or more coils 411 and 412. The pen controller 410 may provide charging power to the stylus pen 201 through the one or more coils 411 and 412. When the stylus pen 201 is inserted to a first inner space 212 which is an accommodation space of the electronic device 101, the one or more coils 411 and 412 may be disposed at a position physically adjacent to the coil 421 of the stylus pen 201, but the position is not limited thereto. Meanwhile, the insertion to the accommodation space is for example purposes only, and the electronic device 101 may include a region (or space) in which the stylus pen 201 is mountable (or attachable), in addition to the accommodation space. In this case, the stylus pen 201 may be detachable from the region (or space). An operation of the stylus pen 201 when it is located in the accommodation space in the disclosure may be performed when it is attached (or aligned) to a mounting region (or space, specified position) in another embodiment, which will be understood by those skilled in the art. At least some functions of the pen controller 410 may be performed by the processor 120, or the pen controller 410 and the processor 120 may be implemented in an integral manner to perform the at least some functions. Alternatively, the pen controller 410 may be implemented to be integrated with a sensing panel controller to be described below. In the disclosure, when it is expressed that the pen controller 410 performs a specific operation, it may imply that the operation is performed by the processor 120, or is performed by a control circuit independent of the processor 120. In addition to the one or more coils 411 and 412, the pen controller 410 may include a control circuit (e.g., a control circuit independent of the processor 120), an inverter, and/or an amplifier. As described above, the pen controller 410 may not include the control circuit. In this case, a signal for charging may be provided to the one or more coils 411 and 412 under the control of the processor 120.

According to an embodiment, the pen controller 410 may provide a burst signal having a pattern, through the one or more coils 411 and 412. The pattern is pre-shared with the stylus pen 201 for the control of the stylus pen 201, and may include, for example, a charging initiation indication pattern, a charging end indication pattern, or a detection pattern, and there is no limitation in a type thereof. Although it is illustrated that the two coils 411 and 412 provide a signal for charging or a burst signal having a pattern for a control, this is for example purposes only, and the number of coils is not limited thereto.

According to an embodiment, a resonant circuit 420 (e.g., the resonant circuit 287 of FIG. 3A) of the stylus pen 201 may include a coil 421, one or more capacitors 422 and 423, and/or a switch 424. When the switch 424 is in an off-state, the coil 421 and the capacitor 422 may constitute a resonant circuit, and when the switch 424 is in an on-state, the coil 421 and the capacitors 422 and 423 may constitute the resonant circuit. Therefore, a resonant frequency of the resonant circuit 420 may be changed according to the on/off state. For example, the electronic device 101 may identify the on/off state of the switch 424, based on a frequency of a signal from the stylus pen 201. For example, when a button 337 of the stylus pen 201 is pressed/released, the switch 424 may be on/off, and the electronic device 101 may identify whether the button 337 of the stylus pen 201 is pressed, based on a frequency of a received signal identified through a digitizer.

According to an embodiment, one or more rectifiers 431 and 435 may rectify and output an Alternating Current (AC) waveform signal VPEN output from the resonant circuit 420. A charging switch controller (SWchg ctrl) 432 may receive a rectified signal VM output from the rectifier 431. Based on the rectified signal VM, the SWchg ctrl 432 may identify whether a signal generated from the resonant circuit 420 is a signal for charging or a signal for position detection. For example, the SWchg ctrl 432 may identify whether the signal generated from the resonant circuit 420 is a signal for charging or a signal for position detection, for example, based on a magnitude of voltage of the rectified signal VM. Alternatively, the SWchg ctrl 432 may identify whether a burst signal having a charging initiation pattern is input based on a waveform of the rectified signal VM.

According to an embodiment, when it is identified that the signal is for charging, the SWchg ctrl 432 may control a charging switch (SWchg) 436 to be in the on-state. Alternatively, upon detecting the burst signal having the charging initiation pattern, the SWchg ctrl 432 may control the SWchg 436 to be in the on-state. The SWchg ctrl 432 may transfer a charging initiation signal chg on to the SWchg 436. In this case, a rectified signal VIN may be transferred to a battery 437 (e.g., the battery 289 of FIG. 3A) through the SWchg 436. The battery 437 may be charged by using the received rectified signal VIN. An Over-Voltage Protection Circuit (OVP) 433 may identify a battery voltage VBAT, and if the battery voltage exceeds an over-voltage threshold, may control the SWchg 436 to be in the off-state.

According to an embodiment, when it is identified that the battery voltage exceeds an operating voltage threshold, a load switch controller (SWL ctrl) 434 may control a load switch (SWL) 438 to be in the on-state. When the SWL 438 is in the on-state, power from the battery 437 may be transferred to a BLE+controller 439 (e.g., the communication circuit 290 and processor 220 of FIG. 3A). The BLE+controller 439 may operate by using the received power. If a distance between the stylus pen 201 and the electronic device 101 is greater than a threshold distance, a button control circuit 440 may transfer information on an input of a button (e.g., the button 337) to the BLE+controller 439. The BLE+controller 439 may transmit information on the received button input to the electronic device 101 through an antenna 441 (e.g., the antenna 297 of FIG. 3A). A sensor circuit 450 (e.g., the sensor 299 of FIG. 3A) may include a gyro sensor 451 and/or an accelerometer 452. Sensing data obtained by the gyro sensor 451 and/or the accelerometer 452 may be transferred to the BLE+controller 439. The BLE+controller 439 may transmit a communication signal including the received sensing data to the electronic device 101 through the antenna 441. Alternatively, the BLE+controller 439 may identify information related to a position of the stylus pen 201 (e.g., a coordinate and/or displacement of the stylus pen 201), identified based on the received sensing data. The BLE+controller 439 may transmit the identified information related to the position of the stylus pen 201 to the electronic device 101 through the antenna 441. According to an embodiment, when the stylus pen 201 is removed from the electronic device 101, the BLE+controller 439 may activate the accelerometer 452. When the button (e.g., the button 337) is pressed, the BLE+controller 439 may activate the gyro sensor 451. Meanwhile, an activation timing is for example purposes only, and there is no limitation in the activation timing for each sensor. In addition, the sensor circuit 450 may further include a geomagnetic sensor. When the accelerometer 452 is activated (e.g., only the accelerometer 452 is activated), the stylus pen 201 may provide acceleration information measured by the accelerometer 452 to the electronic device 101, and the electronic device 101 may operate based on both position and acceleration information of the stylus pen 201, identified based on a pen signal.

Figure 5:
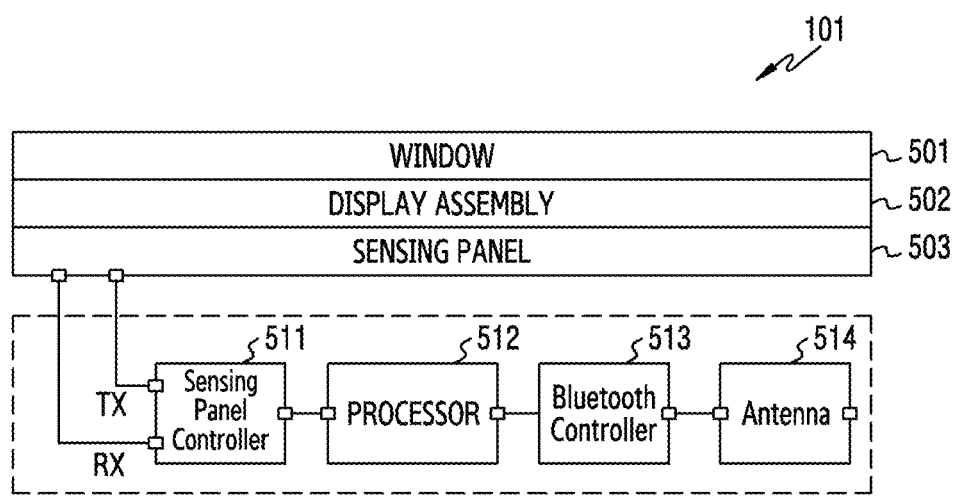
FIG. 5 illustrates a drawing for describing a structure of an electronic device according to an embodiment.

FIG. 5 illustrates a drawing for describing a structure of the electronic device 101 according to an embodiment.

According to an embodiment, the electronic device 101 may include a sensing panel controller 511, a processor 512 (e.g., the processor 120), a Bluetooth controller 513 (e.g., the communication module 190), and/or an antenna 514. The electronic device 101 may include a sensing panel 503, a display assembly 502 disposed on the sensing panel 503, and/or a window 501 disposed on the display assembly 502. According to an implementation, when the sensing panel 503 is implemented as a digitizer, a touch sensor panel for sensing a user's touch may be further disposed on an upper or lower side thereof. The touch sensor panel may be located at an upper side of the display assembly 502. As described above, the sensing panel 503 may be implemented as a digitizer and include a plurality of loop coils. According to various embodiments, when implemented as the digitizer, the sensing panel 503 may include an element (e.g., an amplifier) for applying an electrical signal (e.g., a transmission signal) to the loop coils. The sensing panel 503 may include an element (e.g., an amplifier, a capacitor, an ADC) for processing a signal (e.g., an input signal) output from the loop coils. The sensing panel 503 may identify a position of the stylus pen 201 and output the identified position of the stylus pen to the processor 120, based on magnitudes of signals respectively output from the loop coils (e.g., digital values converted for respective channels). Alternatively, according to an implementation, the processor 120 may identify the position of the stylus pen 201, based on the magnitudes of signals respectively output from the loop coils (e.g., digital values converted for respective channels). For example, the sensing panel 503 may apply current to at least one of the loop coils, and the at least one coil may produce a magnetic field. The stylus pen 201 may resonate due to the magnetic field produced therearound, and a magnetic field may be produced from the stylus pen 201 due to the resonance. Current may be output from each of the loop coils, due to the magnetic field produced from the stylus pen 201. The electronic device 101 may identify the position of the stylus pen 201, based on magnitudes of current for the respective loop coils (e.g., converted digital values). In order to determine the position of the stylus pen 201 of the loop coils, coils extending in one axis (e.g., an x-axis) and coils extending in another direction (e.g., a y-axis) may be included, and there is no limitation in an arrangement thereof. The sensing panel controller 511 may apply a transmission signal Tx to at least one of the plurality of loop coils of the sensing panel 503, and a loop coil which has received the transmission signal Tx may produce a magnetic field. The sensing panel controller 511 may receive a reception signal Rx output from at least one of the plurality of loop coils in a time-divided manner. The sensing panel controller 511 may identify the position of the stylus pen 201, based on the reception signal Rx, and may transfer the position of the stylus pen 201 to the processor 512. For example, the reception signal Rx may be different for each of the plurality of loop coils (e.g., for each channel), and the position of the stylus pen 201 may be identified based on the magnitudes of the reception signals. In addition, the electronic device 101 may identify whether a button (e.g., the button 337) of the stylus pen 201 is pressed, based on a frequency of the reception signal. For example, when the frequency of the reception signal is a first frequency, the electronic device 101 may identify that the button of the stylus pen 201 is in a pressed state, and when the frequency of the reception signal is a second frequency, the electronic device 110 may identify that the button of the stylus pen 201 is in a released state. Alternatively, when the sensing panel is implemented as a Touch Sensing Panel (TSP), the sensing panel 503 may identify the position of the stylus pen 200, based on an output signal from an electrode of the sensing panel 503. Alternatively, the electronic device 101 may detect a pen, based on a change in capacitance (mutual capacitance and/or self-capacitance) at the electrode of the sensing panel 503. Hardware capable of sensing a pen signal from the stylus pen of the TSP or the digitizer may be named as the sensing panel 503. When the position of the stylus pen 201 is identified by using the TSP, the electronic device 101 may also identify whether the button is pressed, based on a received communication signal. In an embodiment, the electronic device 101 may detect the stylus pen (or the position of the stylus pen) by recognizing static electricity, based on an AES scheme.

The sensing panel controller 511 may identify whether the stylus pen 201 is inserted (or coupled or attached) to the electronic device 101, based on the reception signal, and may transfer this to the processor 512. According to an implementation, the sensing panel controller 511 may be implemented integrally with the sensing panel 503. The processor 512 may transmit a signal for wireless charging, based on whether the pen is inserted. The processor 512 may control the Bluetooth control 513, based on whether the pen is inserted, and if a wireless communication connection is not established, may provide control to establish the wireless communication connection to the stylus pen 201. In addition, when the stylus pen 201 is mounted, charging capacity information may be transmitted to the electronic device 101, and when the stylus pen 201 is removed, information on button pressing and sensor data may be transmitted to the electronic device 101. In addition, the processor 512 may provide control to output a charging signal and a control signal to the sensing panel controller 511, based on data received from the stylus pen 201. The processor 512 may identify a gesture of the stylus pen 201, based on the data received from the stylus pen 201, and may perform an operation corresponding to the gesture. The processor 512 may transfer a function mapped to the gesture to an application. The Bluetooth controller 513 may transmit and receive information through the stylus pen 201 and the antenna 514. The display assembly 502 may include an element for displaying a screen. The window 501 may be constructed of a transparent material so that at least part of the display assembly 502 is visually exposed.

Figure 6A:
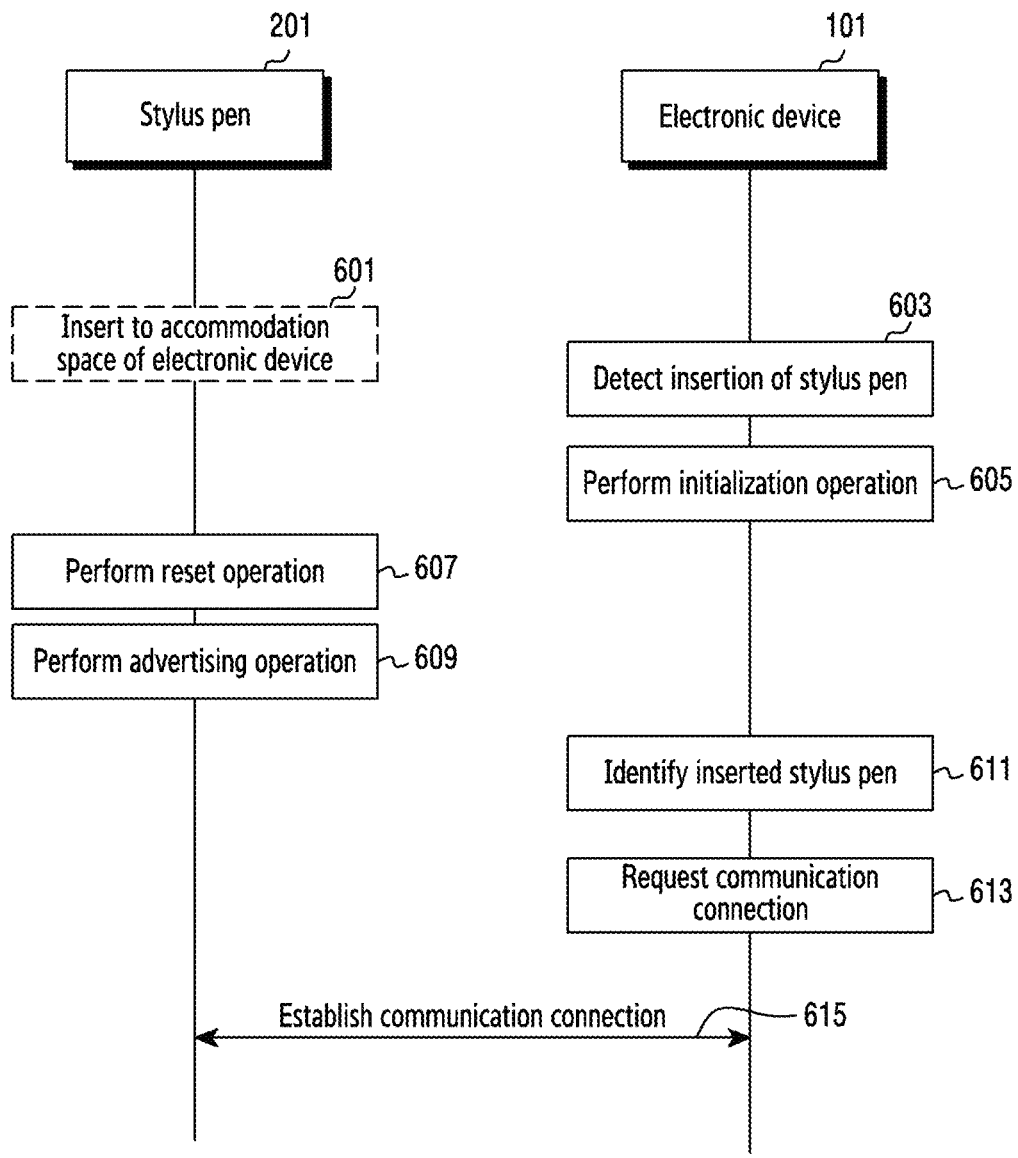
FIG. 6A illustrates operations of a stylus pen and electronic device when the stylus pen is inserted to the electronic device according to an embodiment.

FIG. 6A illustrates operations of the stylus pen 291 and electronic device 101 when the stylus pen 201 is inserted to the electronic device according to an embodiment.

According to an embodiment, in operation 601, the stylus pen 201 may be inserted to an accommodation space of the electronic device 101. For example, a user may insert the stylus pen 201 to the accommodation space of the electronic device 101, and since this operation is not an active operation of the stylus pen 201, this operation is illustrated by a dotted line. The embodiment of FIG. 6 describes a case where the stylus pen 201 is inserted to the electronic device 101 before a communication connection is established between the stylus pen 201 and the electronic device 101. In the disclosure, when the electronic device 101 or the stylus pen 201 performs a specific operation, this may mean that the processor 220 included in the electronic device 101 or the processor 220 included in the stylus pen 201 performs the specific operation. When the electronic device 101 or the stylus pen 201 performs a specific operation, it may mean that the processor 220 included in the electronic device 101 or the processor 220 included in the stylus pen 201 allows another hardware to perform the specific operation. Alternatively, when the electronic device 101 or the stylus pen 201 performs a specific operation, it may mean that an instruction stored in a memory is executed or the instruction is stored, so that the processor 220 included in the electronic device 101 or the processor 220 included in the stylus pen 201 performs the specific operation.

According to an embodiment, in operation 603, the electronic device 101 may detect the insertion of the stylus pen 201. For example, the electronic device 101 may detect the insertion of the stylus pen 201, based on a reception signal received from the stylus pen 201 in response to a transmission signal transmitted through a digitizer, but there is no limitation in an insertion detecting scheme, which will be understood by those skilled in the art. In operation 605, the electronic device 101 may perform an initialization operation, and for example, may transfer a reset command to the stylus pen 201. In operation 607, the stylus pen 201 may perform a reset operation. For example, the stylus pen 201 may release the existing BLE connection. In operation 609, the stylus pen 201 may perform an advertising operation. For example, the stylus pen 201 may broadcast an advertisement signal. In operation 611, the electronic device 101 may identify the inserted stylus pen 201. The electronic device 101 may identify the inserted stylus pen 201, based on the received advertisement signal. In operation 613, the electronic device 101 may request a communication connection. For example, the electronic device 101 may transmit a connection request signal corresponding to the advertisement signal. In operation 615, the stylus pen 201 may establish a communication connection with the electronic device 101.

Figure 6B:
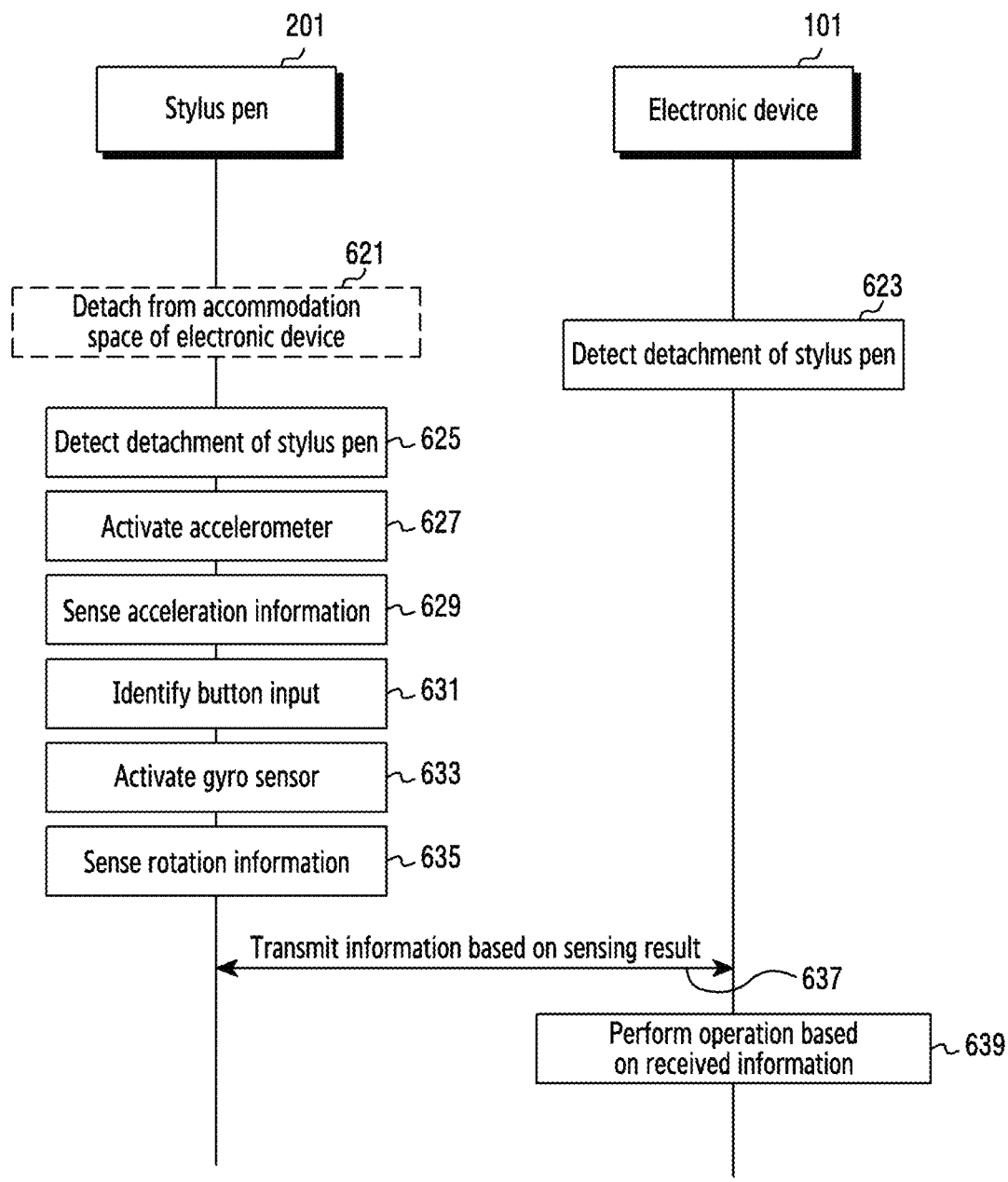
FIG. 6B illustrates operations of a stylus pen and electronic device when the stylus pen is detached from the electronic device according to an embodiment.

FIG. 6B illustrates operations of a stylus pen and electronic device when the stylus pen is detached from the electronic device according to an embodiment.

According to an embodiment, in operation 621, the stylus pen 201 may be detached from an accommodation space of the electronic device 101. For example, a user may take the stylus pen 201 out from the accommodation space of the electronic device 101. In operation 623, the electronic device 101 may detect the detachment of the stylus pen 201. For example, the electronic device 101 may detect the detachment of the stylus pen 201, based on that a signal is not received from the stylus pen 201, but there is no limitation in a detachment detecting scheme. In operation 625, the stylus pen 201 may detect the detachment of the stylus pen 201. For example, the stylus pen 201 may detect the detachment of the stylus pen 201, based on that the signal is not received from the electronic device 101, but there is no limitation in the detachment detecting scheme. When the detachment is detected, the stylus pen 201 may exchange a parameter (e.g., a connection interval and/or a slave latency) with the electronic device 101.

According to an embodiment, in operation 627, the stylus pen 201 may activate an accelerometer, based on the detection of the detachment. In operation 629, the stylus pen 201 may sense acceleration information of the stylus pen 201 through the activated accelerometer. Although not shown, the stylus pen 201 may transmit the sensed acceleration information to the electronic device 101. In an embodiment, the electronic device 101 may perform an operation based on the received acceleration information. In an embodiment, the stylus pen 201 may activate the accelerometer, and a gyro sensor which consumes relatively high power may be configured to maintain an inactive state.

According to an embodiment, in operation 631, the stylus pen 201 may identify an input of a button (e.g., the button 337). The button may be implemented as any one of physical key, touch key, motion key, pressure key, and keyless manners, and there is no limitation in an implementation manner. When the button input is identified, in operation 633, the stylus pen 201 may activate the gyro sensor. In operation 635, the stylus pen 201 may sense rotation information through the activated gyro sensor. In operation 637, the stylus pen 201 may transmit information based on the sensing result. For example, the stylus pen 201 may transmit sensing information obtained through the accelerometer and/or the gyro sensor to the electronic device 101. Alternatively, the stylus pen 201 may identify coordinates (e.g., 2-dimensional coordinates or 3-dimensional coordinates) of the stylus pen 201, based on the sensing information obtained through the accelerometer and/or the gyro sensor, and may transmit the identified coordinates to the electronic device 101. Alternatively, the stylus pen 201 may identify displacement information of the coordinates (e.g., the 2-dimensional coordinates or the 3-dimensional coordinates) of the stylus pen 201, based on the sensing information obtained through the accelerometer and the gyro sensor, and may transmit the identified displacement information to the electronic device 101. In operation 639, the electronic device 101 may perform an operation, based on the received information. Upon receiving the sensing information, the electronic device 101 may identify position information of the stylus pen 201, based on the sensing information, identify a gesture corresponding to the position information, and perform an operation corresponding to the gesture. Upon receiving the position information of the stylus pen 201, the electronic device 101 may identify a gesture corresponding to the position information and perform an operation corresponding to the gesture. For example, the stylus pen 201 may transmit the information to the electronic device 101 until an input of the pen button is released. The electronic device 101 may identify the gesture, based on the position information of the stylus pen 201, identified until the release of the button input is detected. Upon detecting the release of the button input, the stylus pen 201 may deactivate the gyro sensor again. However, in an embodiment, the stylus pen 201 may activate both the gyro sensor and the accelerometer from a time of detecting the detachment. In this case, the position information of the stylus pen 201 before the button is input may be used to correct a gesture direction, and accuracy of gesture recognition may be improved. For example, the electronic device 101 may identify initial posture information of the stylus pen 201, and may recognize a gesture by using a displacement based on this.

Figure 6C:
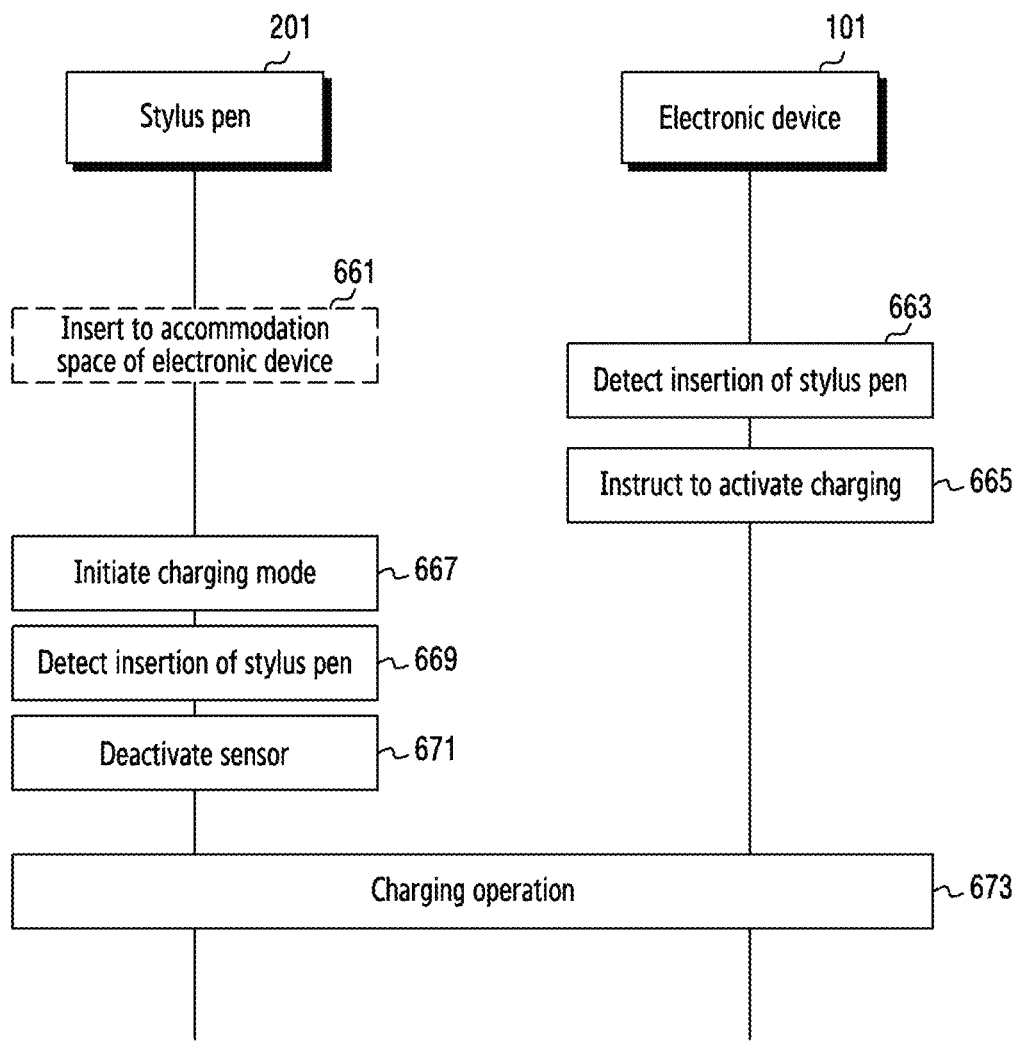
FIG. 6C illustrates operations of an electronic device and stylus pen when the stylus pen is inserted to the electronic device according to an embodiment.

FIG. 6C illustrates operations of an electronic device and stylus pen when the stylus pen is inserted to the electronic device according to an embodiment.

According to an embodiment, in operation 661, the stylus pen 201 may be inserted to an accommodation space of the electronic device 101. For example, the stylus pen 201 may be detached from the accommodation space after the initial insertion and then may be inserted again. In operation 663, the electronic device 101 may detect the insertion of the stylus pen 201. In operation 665, the electronic device 101 may instruct the stylus pen 201 to activate charging. For example, the electronic device 101 may instruct to activate the charging, based on burst transmission having a pattern through an accommodation space coil or transmission of a communication signal through a communication module. In operation 667, the stylus pen 201 may initiate a charging mode. In operation 669, the stylus pen 201 may detect the insertion of the stylus pen 201. The stylus pen 201 may identify whether the stylus pen 201 is inserted, based on information received from the electronic device 101 or a magnitude of voltage applied to a resonant circuit (e.g., an output stage of a rectifier) of the stylus pen. In operation 671, the stylus pen 201 may deactivate a sensor. The stylus pen 201 may deactivate some sensors, or may be configured to skip the deactivation of the sensor. In operation 673, the electronic device 101 and the stylus pen 201 may perform a charging operation. In various embodiments, the charging operation in the operation 673 may be performed immediately after the charging mode is initiated, and there is no limitation in a time of performing the operation.

Figure 7A:
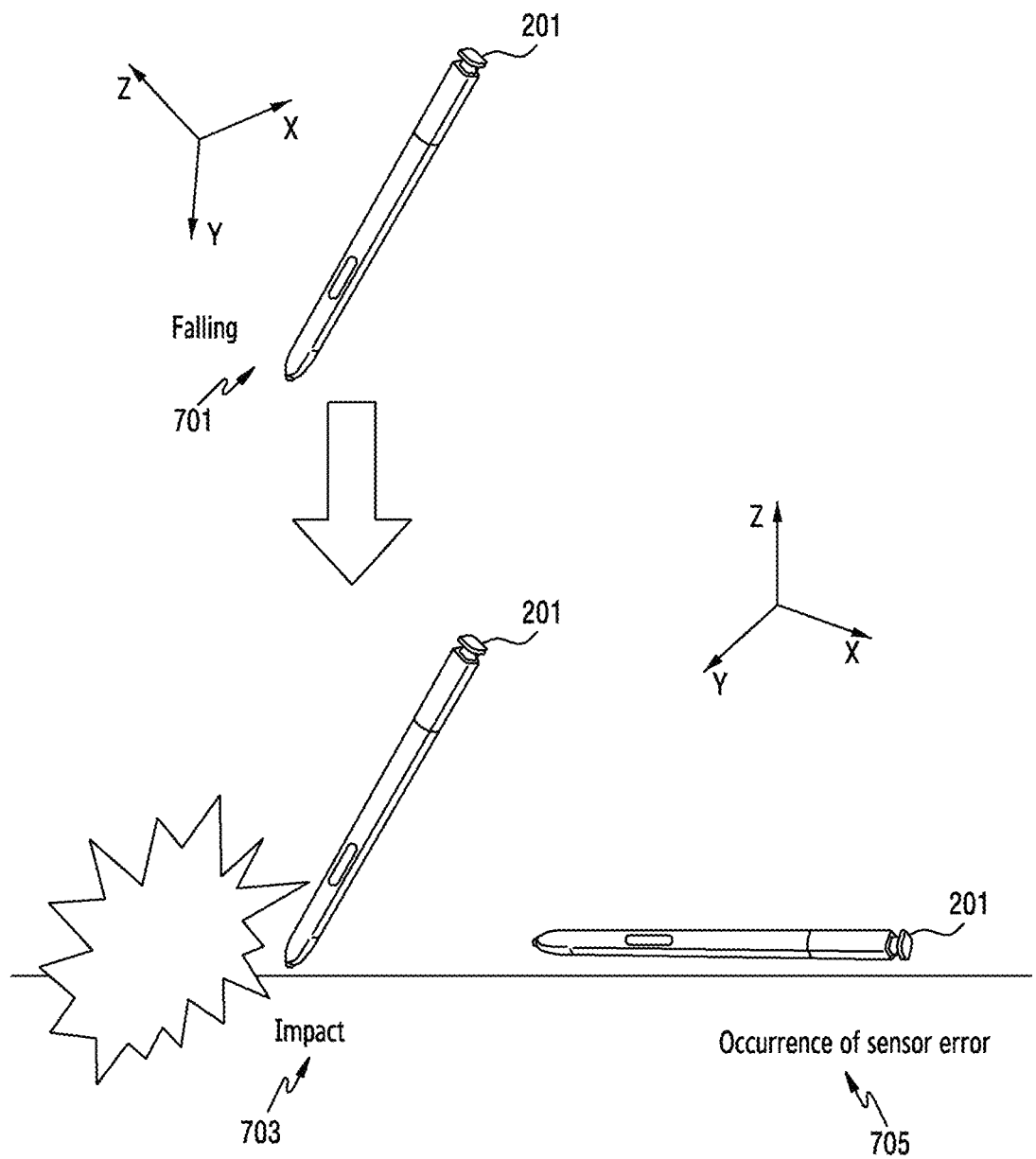
FIG. 7A illustrates a situation in which a sensor error occurs in a stylus pen according to an embodiment.

FIG. 7A illustrates a situation in which a sensor error occurs in the stylus pen 201 according to an embodiment.

Referring to FIG. 7A, in a situation 701, the stylus pen 201 may be in free fall from a predetermined height. In a situation 703, the stylus pen 201 may hit the floor so that an impact is applied. In a situation 705, an error of the sensor 299 may occur in the stylus pen 201.

In an embodiment, calibration may be required for the error of the sensor 299 in the stylus pen 201. In an embodiment, the calibration for the error of the sensor 299 may also be referred to as baseline correction for the sensor 299. In an embodiment, the baseline may also be referred to as an offset. In an embodiment, the baseline may also be referred to as an offset. In an embodiment, the baseline may also be referred to as an offset for a plurality of directional axes (e.g., 6 axes (3 directional axes related to acceleration and 3 directional axes related to gyro) and 9 axes (3 directional axes related to acceleration, 3 directional axes related to gyro, and 3 directional axes related to geomagnetic field)) measurable by the sensor 299.

FIG. 7A illustrates only one example situation in which an error of the sensor 299 occurs in the stylus pen 201, and the occurrence of the error of the sensor 299 is not limited to the impact. In an embodiment, an error may occur in the sensor 299 when a specific time elapses after baseline correction is performed for the sensor 299. In an embodiment, the error may occur in the sensor 299 due to an environment (e.g., temperature, altitude, acceleration, pressure, magnetic field, and combination of them) of the stylus pen 201.

Figure 7B:
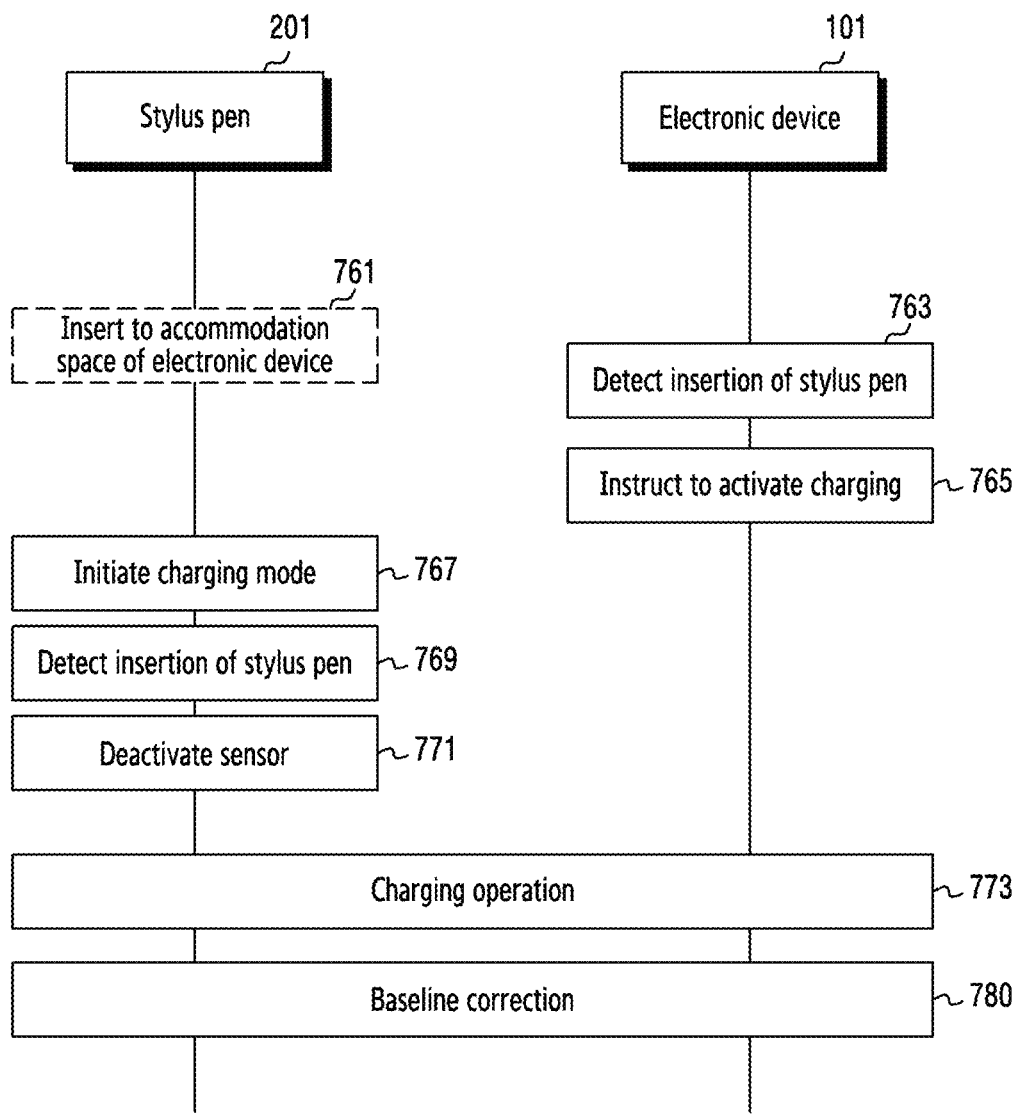
FIG. 7B illustrates a method of a baseline correction operation for a stylus pen of an electronic device when the stylus pen is inserted according to an embodiment.

FIG. 7B illustrates a baseline correction operation for the stylus pen 201 of the electronic device 101 when the stylus pen 201 is inserted according to an embodiment.

Operations 761 to 773 of FIG. 7B may correspond to the operations 661 to 673 of FIG. 6C.

Referring to FIG. 7B, in operation 780, the electronic device 101 and the stylus pen 201 may perform a baseline correction operation.

Although it is shown in FIG. 7B that the operation 780 is performed after the operation 773, this is for example purposes only. In an embodiment, the operation 780 may be performed any time after the electronic device 101 detects the insertion of the stylus pen 201. In an embodiment, the operation 780 may be performed after the operation 763. In an embodiment, the operation 780 may be performed before the operation 765, 767, 769, 771, or 773.

In an embodiment, the electronic device 101 may perform the operation 780 while the stylus pen 201 maintains a state of being inserted to the electronic device 101. In an embodiment, a baseline correction operation for the stylus pen 201 may also be referred to as calibration for the stylus pen 201.

Although it is illustrated in FIG. 7B that the operation 780 is performed when the stylus pen 201 is inserted to an accommodation space of the electronic device 101, this is for example purposes only. In an embodiment, the electronic device 101 may perform the operation 780 while the stylus pen 201 is aligned to a specified position (e.g., a front bezel portion, a lateral face, a rear face) of the electronic device 101 and the alignment is maintained. In an embodiment, the electronic device 101 may identify that the stylus pen 201 is attached at the specified position of the electronic device 101 through at least one of coils 411 and 412.

In an embodiment, the electronic device 101 may identify that the stylus pen 201 is attached at the specified position of the electronic device 101, based on a signal induced to the at least one of the coils 411 and 412 of the electronic device 101 due to the coil 421 of the stylus pen 201. In an embodiment, upon identifying that the stylus pen 201 is attached at the specified position of the electronic device 101, the electronic device 101 may perform the operation 780.

Figure 8:
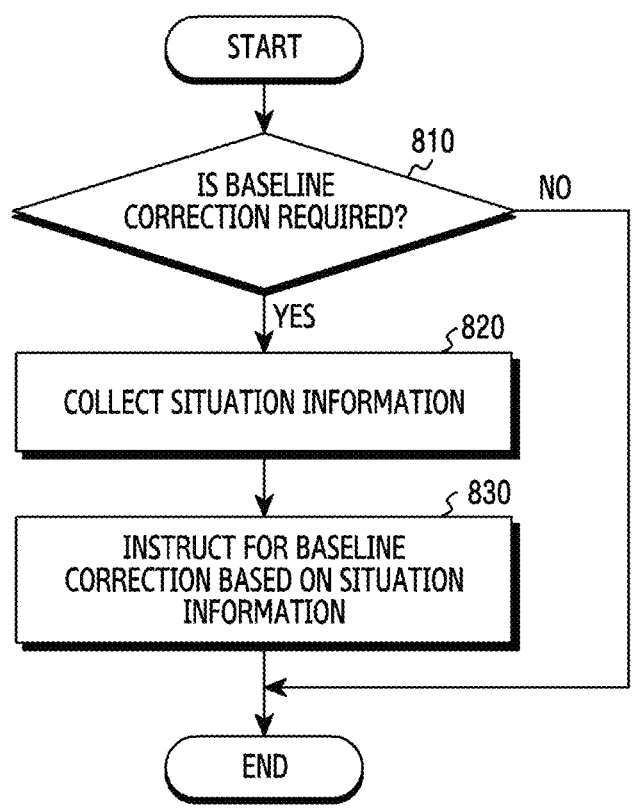
FIG. 8 illustrates a baseline correction operation for a stylus pen, based on situation information of an electronic device according to an embodiment.

FIG. 8 illustrates a baseline correction operation for the stylus pen 201, based on situation information of the electronic device 101 according to an embodiment. In an embodiment, operations of FIG. 8 may be included in the operation 780 of FIG. 7.

Referring to FIG. 8, in operation 810, the processor 120 of the electronic device 101 may identify whether baseline correction is required for the stylus pen 201. In an embodiment, the processor 120 of the electronic device 101 may identify whether the baseline correction is required for the stylus pen 201, based on a specified condition. In an embodiment, the processor 120 of the electronic device 101 may identify whether the baseline correction is required for the stylus pen 201, based on information indicating whether the specified condition is satisfied. In an embodiment, the information indicating whether the specified condition is satisfied may be information generated before insertion of the stylus pen 201 and stored in the memory 130. However, this is for example purposes only, and the information indicating whether the specified condition is satisfied is not limited to the information generated before insertion of the stylus pen 201 and stored in the memory 130. In an embodiment, the information indicating whether the specified condition is satisfied may be generated after the stylus pen 201 is inserted to the electronic device 101.

In an embodiment, when one of the specified conditions is occurrence of an impact to the stylus pen 201, the information indicating whether the specified condition is satisfied may indicate whether the impact to the stylus pen 201 occurs.

In an embodiment, the processor 220 of the stylus pen 201 may identify the impact to the stylus pen 201, based on an acceleration value detected from the sensor 299, and may notify the electronic device 101 of the occurrence of the identified impact through the resonant circuit 287 and/or the antenna 297. In an embodiment, the processor 120 of the electronic device 101 may identify the occurrence of the impact to the stylus pen 201, based on the notification reporting the occurrence of the impact from the stylus pen 201, and may update the information indicating whether the specified condition is satisfied. In an embodiment, when the stylus pen 201 is inserted after the information is updated to indicate the occurrence of the impact to the stylus pen 201, the processor 120 of the electronic device 101 may identify that baseline correction is required for the stylus pen 201, based on the information indicating whether the specified condition is satisfied.

In an embodiment, the processor 220 of the stylus pen 201 may notify the electronic device 101 of an acceleration value detected from the sensor 299 through the resonant circuit 287 and/or the antenna 297. In an embodiment, the processor 220 of the stylus pen 201 may identify occurrence of an impact to the stylus pen 201, based on that the acceleration value received from the sensor 299 exceeds a specified reference acceleration value, and may update information indicating whether the specified condition is satisfied. In an embodiment, when the stylus pen 201 is inserted after the information is updated to indicate the occurrence of the impact to the stylus pen 201, the processor 120 of the electronic device 101 may identify that baseline correction is required for the stylus pen 201, based on information indicating whether the specified condition is satisfied.

In an embodiment, if one of the specified conditions is that a time (e.g., 8 hours, 12 hours, 24 hours) corresponding to a predetermined correction period elapses after the baseline correction is performed for the stylus pen 201, the information indicating whether the specified condition is satisfied may indicate whether the time corresponding to the predetermined correction period elapses after the baseline correction is performed for the stylus pen 201.

In an embodiment, the processor 120 of the electronic device 101 may identify that a time corresponding to the predetermined correction period elapses after performing the baseline correction for the stylus pen 201, based on a time of transmitting a baseline correction command to the stylus pen 201 and a current time, and may update information indicating whether the specified condition is satisfied. In an embodiment, when the stylus pen 201 is inserted after the information is updated to indicate that the time corresponding to the predetermined correction period elapses after the baseline correction is performed for the stylus pen 201, the processor 120 of the electronic device 101 may identify that the baseline correction is required for the stylus pen 201, based on information indicating whether the specified condition is satisfied.

In an embodiment, when one of the specified conditions is occurrence of an altitude change for the electronic device 101 and/or the stylus pen 201, the information indicating whether the specified condition is satisfied may indicate whether the altitude change occurs in the electronic device 101 and/or the stylus pen 201.

In an embodiment, the processor 120 of the electronic device 101 may identify the altitude change for the electronic device 101, based on an altitude value detected from the sensor module 176, and may update the information indicating whether the specified condition is satisfied. In an embodiment, when the stylus pen 201 is inserted after the information is updated to indicate the occurrence of the altitude change for the electronic device 101, the processor 120 of the electronic device 101 may identify that baseline correction is required for the stylus pen 201, based on the information indicating whether the specified condition is satisfied.

In an embodiment, the processor 220 of the stylus pen 201 may notify the electronic device 10 of the altitude value detected from the sensor 299 through the resonant circuit 287 and/or the antenna 297. In an embodiment, the processor 120 of the electronic device 101 may identify the altitude change for the stylus pen 201, based on that the altitude value received from the stylus pen 201 exceeds a specified reference altitude value, and may update the information indicating whether the specified condition is satisfied. In an embodiment, when the stylus pen 201 is inserted after the information is updated to indicate the occurrence of the altitude change for the electronic device 101, the processor 120 of the electronic device 101 may identify that the baseline correction is required for the stylus pen 201, based on the information indicating whether the specified condition is satisfied.

In an embodiment, the processor 120 of the electronic device 101 may identify the altitude change for the electronic device 101, based on that an altitude change level detected from the sensor module 176 after the baseline correction is performed for the stylus pen 201 exceeds a reference altitude change level, and may update the information indicating whether the specified condition is satisfied. In an embodiment, when the stylus pen 201 is inserted after the information is updated to indicate the occurrence of the altitude change for the electronic device 101, the processor 120 of the electronic device 101 may identify that the baseline correction is required for the stylus pen 201, based on the information indicating whether the specified condition is satisfied.

In an embodiment, the processor 220 of the stylus pen 201 may identify the altitude change for the stylus pen 201, based on that the altitude value detected from the sensor 299 exceeds the specified reference altitude value, and may notify the electronic device 101 of the occurrence of the identified altitude change through the resonant circuit 287 and/or the antenna 297. In an embodiment, the processor 120 of the electronic device 101 may identify the occurrence of the altitude change for the stylus pen 201, based on the notification reporting the occurrence of the altitude change from the stylus pen 201, and may update the information indicating whether the specified condition is satisfied. In an embodiment, when the stylus pen 201 is inserted after the information is updated to indicate the occurrence of the altitude change for the stylus pen 201, the processor 120 of the electronic device 101 may identify that the baseline correction is required for the stylus pen 201, based on the information indicating whether the specified condition is satisfied.

In an embodiment, the processor 220 of the stylus pen 201 may identify the altitude change for the stylus pen 201, based on that the altitude change level detected from the sensor 299 exceeds the reference altitude change level, and may notify the electronic device 101 of the occurrence of the identified altitude change through the resonant circuit 287 and/or the antenna 297. In an embodiment, the processor 120 of the electronic device 101 may identify the occurrence of the altitude change for the stylus pen 201, based on the notification reporting the occurrence of the altitude change from the stylus pen 201, and may update the information indicating whether the specified condition is satisfied. In an embodiment, when the stylus pen 201 is inserted after the information is updated to indicate the occurrence of the altitude change for the stylus pen 201, the processor 120 of the electronic device 101 may identify that the baseline correction is required for the stylus pen 201, based on the information indicating whether the specified condition is satisfied.

In an embodiment, when the information indicating whether the specified condition is satisfied indicates that at least one condition among specified conditions is satisfied, the processor 120 of the electronic device 101 may identify that the baseline correction is required for the stylus pen 201.

In an embodiment, in response to an identification in operation 810 that the baseline correction is required (i.e., if "Yes"), the processor 120 may perform the operation 820. In an embodiment, in response to an identification in operation 810 that the baseline correction is not required (i.e., if "No"), the processor 120 may end the baseline correction operation for the stylus pen 201.

In operation 820, the processor 120 may collect situation information. In an embodiment, the situation information may include situation information related to the electronic device 101 and/or situation information related to the stylus pen 201. In an embodiment, the processor 120 may collect the situation information by using a first sensor (e.g., the sensor module 176 of the electronic device 101), a second sensor (e.g., the sensor 299 of the stylus pen 201), or a combination of them.

In an embodiment, the situation information may indicate an absence time of a user input to the electronic device 101. In an embodiment, the situation information may indicate a time ranging from a time when the user input is most recently input to the electronic device 101 to a current time.

In an embodiment, the situation information may indicate that a state of the electronic device 101 has automatically transitioned without the user input. In an embodiment, the situation information may indicate that the electronic device 101 enters a sleep mode when the absence time of the user input to the electronic device 101 exceeds a predetermined absence time.

In an embodiment, the situation information may indicate that the state of the electronic device 101 is a predetermined state. In an embodiment, the predetermined state may be a stay motion state of the electronic device 101. In an embodiment, the predetermined state may be a state where a change in acceleration, gyro, geomagnetism, or combination of them is not detected from the sensor module 176 of the electronic device 101.

In an embodiment, the situation information may indicate the state of the electronic device 101. In an embodiment, the situation information may indicate that the electronic device 101 is in a moving state or a stationary state. In an embodiment, the situation information may indicate that the electronic device 101 is in a predetermined moving state. In an embodiment, the processor 120 may display a screen for guiding an input of a predetermined pattern through the display device 160, and may receive sensing data detected through the sensor module 176. In an embodiment, the sensing data detected through the sensor module 176 may be situation information indicating that a predetermined moving state corresponding to a predetermined pattern.

In an embodiment, the situation information may indicate first sensing data detected from the sensor module 176 of the electronic device 101 and first pen sensing data detected from the sensor 299 of the stylus pen 201. In an embodiment, the first sensing data and the first pen sensing data may be mutually synched data. In an embodiment, when the sensor module 176, the sensor 199, or a combination of them is a 6-axis (3 directional axes related to acceleration and 3 directional axes related to gyro) sensor, the sensing data may indicate 6-axis sensing data. In an embodiment, when the sensor module 176, the sensor 299, or the combination of them is a 9-axis (3 directional axes related to acceleration, 3 directional axes related to gyro, and 3 directional axes related to geomagnetism) sensor, the sensing data may indicate 9-axis sensing data.

In an embodiment, the electronic device 101 may transmit a synch signal to the stylus pen 201, obtain first sensing data by using the sensor module 176, and obtain first pen sensing data from the stylus pen 201, thereby obtaining mutually synched first sensing data and first pen sensing data. In an embodiment, the electronic device 101 may transmit the synch signal to the stylus pen 201 through the pen controller 410, the communication module 190, or the combination of them. In an embodiment, sensing data obtained from the stylus pen 201 may be referred to as pen sensing data.

In an embodiment, the situation information may indicate a communication state between the electronic device 101 and the stylus pen 201. In an embodiment, the situation information may indicate a state where the electronic device 101 is capable of transmitting and receiving data with respect to the stylus pen 201 through the pen controller 410, the communication module 190, or the combination of them.

In operation 830, the processor 120 may transmit a baseline correction command to the stylus pen 201, based on the situation information. In an embodiment, the processor 120 may determine whether the baseline correction command is available based on the situation information, and upon determining that the baseline correction command is available, may transmit the baseline correction command to the stylus pen 201. In an embodiment, the processor 120 may determine whether the correction command is available, by determining whether the stylus pen 201 is in a state where correction is possible, based on the situation information. In an embodiment, the processor 120 may generate the baseline correction command, based on the situation information, and may transmit the generated baseline correction command to the stylus pen 201. In an embodiment, the processor 120 may determine at least one directional axis which requires baseline correction among a plurality of directional axes (e.g., 6 axes, 9 axes) measurable by the sensor 299 of the stylus pen 201, based on the situation information, may generate a baseline correction command which instructs to correct the determined at least one directional axis, and may transmit the generated baseline correction command to the stylus pen 201.

In an embodiment, if the situation information indicates a situation where an absence time of a user input to the electronic device 101 exceeds a predetermined absence time, the processor 120 may identify that the baseline correction command is available.

In an embodiment, if the situation information indicates that the state of the electronic device 101 has automatically transitioned without the user input, the processor 120 may identify that the baseline correction command is available. In an embodiment, if the situation information indicates that the electronic device 101 has automatically entered a sleep mode, the processor 120 may identify that the baseline correction command is available.

In an embodiment, if the situation information indicates that the state of the electronic device 101 is a predetermined state, the processor 120 may identify that the baseline correction command is available. In an embodiment, if the situation information indicates a stay motion state of the electronic device 101, the processor 120 may identify that the baseline correction command is available. In an embodiment, if the situation information indicates a state where a user's contact on the electronic device 101 is not detected from the sensor module 176 of the electronic device 101, the processor 120 may identify that the baseline correction command is available. In an embodiment, if the situation information indicates a state where a change in acceleration, gyro, geomagnetism, or combination of them is not detected from the sensor module 176 of the electronic device 101, the processor 120 may identify that the baseline correction command is available.

In an embodiment, if the situation information indicates a stationary state of the electronic device 101, the processor 120 may identify that the baseline correction command is available. In an embodiment, if the situation information indicates a moving state of the electronic device 101, the processor 120 may identify that the baseline correction command is available. In an embodiment, if the situation information indicates a predetermined moving state (e.g., a moving state corresponding to a predetermined gesture), the processor 120 may identify that the baseline correction command is available.

In an embodiment, the processor 120 may determine directional axes which require baseline correction in the sensor 299 of the stylus pen 201, based on the situation information. In an embodiment, first sensing data detected from the sensor module 176 of the electronic device 101 and first pen sensing data detected from the sensor 299 of the stylus pen 201 may be compared to determine directional axes which require baseline correction in the sensor 299 of the stylus pen 201. In an embodiment, if a value obtained by detecting any directional axis indicated by the first pen sensing data has a value exceeding an allowable error from a value obtained by detecting any directional axis indicated by the first sensing data, the processor 120 may determine corresponding any directional axis as the directional axis which requires baseline correction.

In an embodiment, if the directional axis which requires baseline correction is a first directional axes, the processor 120 may identify whether the electronic device 101 is the stationary state, and if the electronic device 101 is in the stationary state, may transmit a baseline correction command for a corresponding directional axis to the stylus pen 201. In an embodiment, the first directional axis may include three directional axes related to acceleration, three directional axes related to gyro, or a combination of them.

In an embodiment, if the directional axis which requires baseline correction is a first directional axes, the processor 120 may generate data indicating a difference between one piece of sensing data to another piece, generate a baseline correction command for a corresponding directional axis including the generated data, and transmit the generated baseline correction command to the stylus pen 201. In an embodiment, the electronic device 101 may transmit the baseline correction command based on another piece of sensing data obtained from the sensor module 176 to the stylus pen 201 to identify a relative stationary state for the electronic device 101, and may perform baseline correction, based on the identified relative stationary state. In an embodiment, the first directional axis may include three axes of acceleration, three axes of gyro, and a combination of them.

In an embodiment, when a directional axis which requires baseline correction is a second directional axis, the processor 120 may identify whether the electronic device 101 is in the moving state, and if the electronic device 101 is in the moving state, may transmit a baseline correction command for a corresponding directional axis to the stylus pen 201. In an embodiment, the second directional axis may include three axes of geomagnetism.

In an embodiment, when the directional axis which requires baseline correction is the second directional axis, the processor 120 may display a screen which requests a user to move the electronic device 101 according to a predetermined pattern through the display device 160, and in response to an identification that the electronic device 101 is in the moving state, may transmit the baseline correction command for the corresponding directional axis to the stylus pen 201.

In an embodiment, if situation information indicates a state where communication is possible between the electronic device 101 and the stylus pen 201, the processor 120 may transmit the baseline correction command to the stylus pen 201. In an embodiment, if the situation information indicates the state where communication is possible between the electronic device 101 and the stylus pen 201, the processor 120 may transmit the baseline correction command to the stylus pen 201 through the pen controller 410, the communication module 190, or a combination of them.

In an embodiment, the processor 120 of the electronic device 101 may receive a response for the baseline correction command from the stylus pen 201 through the pen controller 410, the communication module 190, or the combination of them. In an embodiment, the response for the baseline correction command may indicate a baseline correction result.

In an embodiment, if the response for the baseline correction command is not received from the stylus pen 201, the processor 120 may retransmit the baseline correction command to the stylus pen 201. In an embodiment, if the response for the baseline correction command received from the stylus pen 201 indicates a baseline correction failure, the processor 120 may retransmit the baseline correction command to the stylus pen 201. In an embodiment, the processor 120 may retransmit the baseline correction command to the stylus pen 201 by performing the operations 810 to 830 again.

In an embodiment, if the response for the baseline correction command is received from the stylus pen 201, the processor 120 may display a screen which shows information related to the baseline correction for the stylus pen 201 through the display device 160. In an embodiment, the information related to the baseline correction may include a baseline correction time, a whether baseline correction succeeds, or a combination of them.

In an embodiment, if the response for the baseline correction command is received from the stylus pen 201, the processor 120 may store the information related to the baseline correction in the memory 130.

In an embodiment, if the response for the baseline correction command is received from the stylus pen 201, the processor 120 may transmit the information related to the baseline correction to the server 108. In an embodiment, the server 108 may include a server which provides a membership service (e.g., Samsung Members), a server which provides a service history management service, or a combination of them. In an embodiment, the server 108 which has received the information related to the baseline correction may manage a baseline correction history related to the stylus pen 201, and may provide another electronic device (e.g., the electronic device 104) with the baseline correction history related to the stylus pen 201 at the request of a user and/or a permitted manager, or may output the baseline correction history to an output device (e.g., the display device 160).

Figure 9:
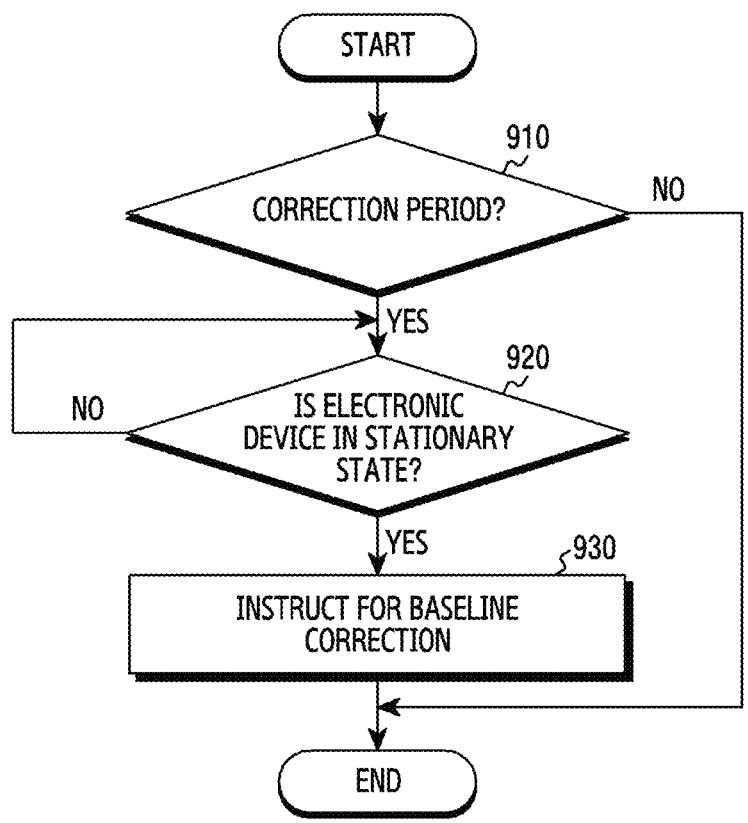
FIG. 9 illustrates a baseline correction operation for a stylus pen, based on a correction period of an electronic device, according to an embodiment.

FIG. 9 illustrates a baseline correction operation for the stylus pen 201, based on a correction period of the electronic device 101, according to an embodiment. In an embodiment, operations of FIG. 9 may be included in the operation 780 of FIG. 7. In an embodiment, the operation 910 of FIG. 9 may be included in the operation 810 of FIG. 8. In an embodiment, the operation 920 of FIG. 9 may be included in the operation 820 of FIG. 8. In an embodiment, the operation 930 of FIG. 9 may be included in the operation 830 of FIG. 8.

Referring to FIG. 9, in operation 910, the processor 120 of the electronic device 101 may identify a baseline correction period for the stylus pen 201. In an embodiment, if a time (e.g., 8 hours, 12 hours, 24 hours) corresponding to a predetermined correction period elapses after baseline correction is performed for the stylus pen 201, the processor 120 may identify that it is the baseline correction period for the stylus pen 201. In an embodiment, if the time (e.g., 8 hours, 12 hours, 24 hours) corresponding to a predetermined correction period does not elapse after baseline correction is performed for the stylus pen 201, the processor 120 may identify that it is not the baseline correction period for the stylus pen 201.

In an embodiment, in response to an identification in operation 910 that it is the baseline correction period (e.g., if "Yes"), the processor 120 may perform operation 920. In an embodiment, in response to an identification in operation 910 that it is not the baseline correction period (e.g., if "No"), the processor 120 may end the baseline correction operation for the stylus pen 201.

In operation 920, the processor 120 may identify whether the electronic device 101 is in a stationary state. In an embodiment, the processor 120 may identify whether the electronic device 101 is in the stationary state, based on sensing data obtained from the sensor module 176.

In an embodiment, if the electronic device 101 is in a stay motion state, the processor 120 may identify that the electronic device 101 is in the stationary state. In an embodiment, if a change in acceleration, gyro, geomagnetism, or combination of them is not detected from the sensor module 176 of the electronic device 101, the processor 120 may identify that the electronic device 101 is in the stationary state.

In an embodiment, in response to an identification in operation 920 that the electronic device 101 is in the stationary state (if "Yes"), the processor 120 may perform operation 930. In an embodiment, in response to an identification in operation 920 that the electronic device 101 is not in the stationary state (if "No"), the processor 120 may perform the operation 920 again. In an embodiment, the processor 120 may repeatedly perform the operation 920 while the stylus pen 201 is inserted in the electronic device 101.

In operation 930, the processor 120 may transmit a baseline correction command to the stylus pen 201. In an embodiment, the processor 120 may determine directional axes which require baseline correction among a plurality of directional axes (e.g., 6 axes, 9 axes) measurable by the sensor 299 of the stylus pen 201, based on first sensing data detected from the sensor module 176 of the electronic device 101 and first pen sensing data detected from the sensor 299 of the stylus pen 201, may generate a baseline correction command which instructs to correct the determined directional axes, and may transmit the generated baseline correction command to the stylus pen 201.

In an embodiment, if situation information indicates a state where communication is possible between the electronic device 101 and the stylus pen 201, the processor 120 may transmit the baseline correction command to the stylus pen 201. In an embodiment, if the situation information indicates the state where communication is possible between the electronic device 101 and the stylus pen 201, the processor 120 may transmit the baseline correction command to the stylus pen 201 through the pen controller 410, the communication module 190, or a combination of them.

In an embodiment, the processor 120 of the electronic device 101 may receive a response for the baseline correction command from the stylus pen 201 through the pen controller 410, the communication module 190, or the combination of them.

In an embodiment, if the response for the baseline correction command is not received from the stylus pen 201, the processor 120 may retransmit the baseline correction command to the stylus pen 201. In an embodiment, if the response for the baseline correction command received from the stylus pen 201 indicates a baseline correction failure, the processor 120 may retransmit the baseline correction command to the stylus pen 201.

In an embodiment, if the response for the baseline correction command is received from the stylus pen 201, the processor 120 may display a screen which shows information related to the baseline correction for the stylus pen 201 through the display device 160. In an embodiment, if the response for the baseline correction command is received from the stylus pen 201, the processor 120 may store the information related to the baseline correction in the memory 130. In an embodiment, if the response for the baseline correction command is received from the stylus pen 201, the processor 120 may transmit the information related to the baseline correction to the server 108.

Figure 10:
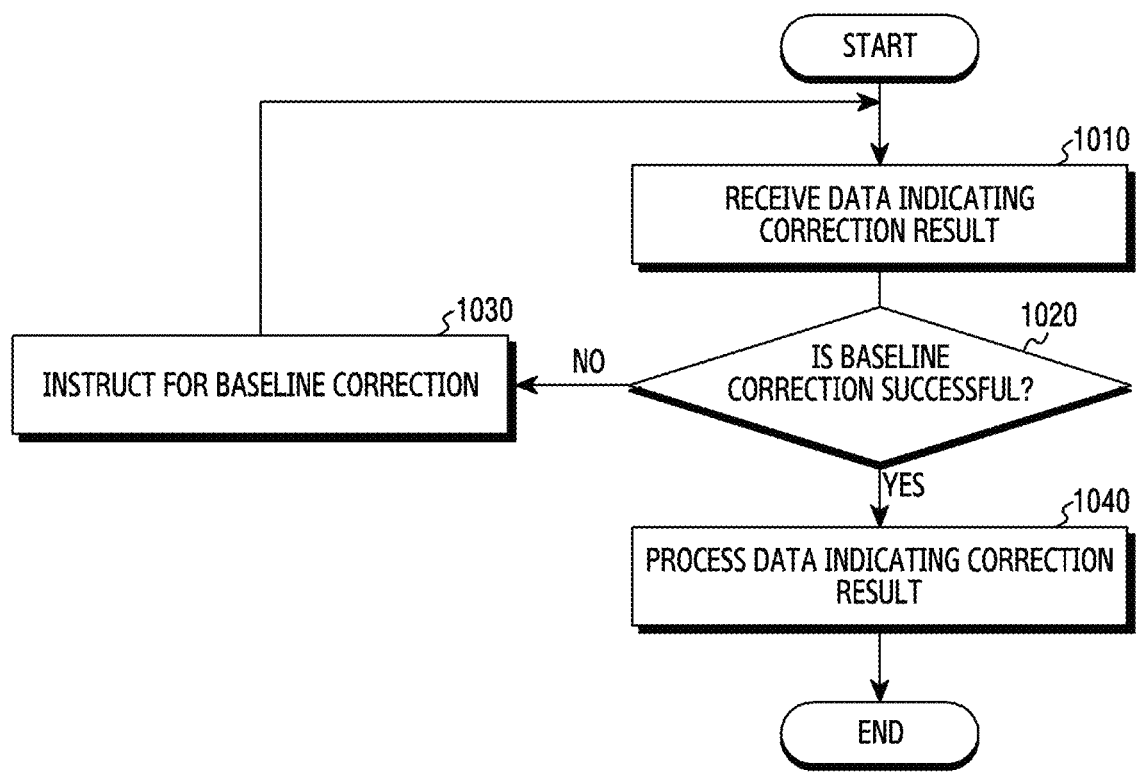
FIG. 10 illustrates an operation after a baseline correction operation for a stylus pen of an electronic device according to an embodiment.

FIG. 10 illustrates an operation after a baseline correction operation for the stylus pen 201 of the electronic device 101 according to an embodiment. In an embodiment, operations of FIG. 10 may be performed after the operation 780 of FIG. 7. In an embodiment, the operations of FIG. 10 may be performed after the operation 830 of FIG. 8. In an embodiment, the operations of FIG. 10 may be performed after the operation 930 of FIG. 9.

Referring to FIG. 10, in operation 1010, the processor 120 of the electronic device 101 may receive data indicating a correction result from the stylus pen 201. In an embodiment, the processor 120 of the electronic device 101 may receive date indicating a baseline correction result from the stylus pen 201 through the pen controller 410, the communication module 290, or a combination of them. In an embodiment, the data indicating the baseline correction result may correspond to a response for a correction command.

Referring to FIG. 10, in operation 1020, the processor 120 of the electronic device 101 may identify whether the baseline correction succeeds. In an embodiment, the processor 120 may identify whether the baseline correction succeeds, based on data indicating the baseline correction result. In an embodiment, if the data indicating the baseline correction result indicates a baseline correction success, the processor 120 may identify a baseline correction success.

In an embodiment, if the baseline correction success is not identified in operation 1020 (i.e., if "No"), the processor 120 may perform operation 1030. In an embodiment, if the baseline correction success is identified in operation 1020 (i.e., if "Yes"), the processor 120 may perform operation 1040.

Referring to FIG. 10, in operation 1030, the processor 120 of the electronic device 101 may transmit a baseline correction command to the stylus pen 201. In an embodiment, the baseline correction command based on the operation 1030 may correspond to the baseline correction command based on the operation 830. In an embodiment, the baseline correction command based on the operation 1030 may correspond to the baseline correction command based on the operation 930.

Referring to FIG. 10, in operation 1040, the processor 120 of the electronic device 101 may process data indicating the baseline correction result.

In an embodiment, the processor 120 may display a screen which shows data indicating the baseline correction result through the display device 160. In an embodiment, the data indicating the baseline correction result may include a baseline correction time, a whether baseline correction succeeds, or a combination of them.

In an embodiment, the processor 120 may store data indicating the baseline correction result in the memory 130.

In an embodiment, the processor 120 may transmit data indicating the baseline correction result to the server 108. In an embodiment, the server 108 may include a server which provides a membership service (e.g., Samsung Members), a server which provides a service history management service, or a combination of them.

As described above, in the electronic device 101 and operation method thereof according to an embodiment, a calibration operation for the stylus pen 201 is performed when a specified condition is satisfied, so that the stylus pen 201 is capable of precisely measuring a position, movement trajectory, and movement speed thereof by using the sensor 299.

As described above, the electronic device 101 according to an embodiment may include a first sensor, a communication circuit, a processor operatively coupled to the first sensor and the communication circuit, and a memory operatively coupled to the processor. The memory may store instructions that, when executed by the processor, cause the processor to determine whether calibration is required for a second sensor of a stylus pen, based on a specified condition, identify that the stylus pen is aligned to a specified position of the electronic device, collect situation information by using the first sensor upon identifying that the stylus pen is aligned to the specified position of the electronic device and upon determining that the calibration is required, and transmit a calibration command to the stylus pen through the communication circuit, based on the situation information.

In an embodiment, the instructions, when executed by the processor, may cause the processor to identify an alignment of the stylus pen, based on that the stylus pen is attached at the specified position of the electronic device.

In an embodiment, the electronic device may further include a coil which produces resonance with a coil of the stylus pen. The instructions, when executed by the processor, may cause the processor to identify that the stylus pen is attached at the specified position of the electronic device, based on a signal induced to the coil of the electronic device by the coil of the stylus pen.

In an embodiment, the instructions, when executed by the processor, may cause the processor to receive, from the stylus pen, first pen sensing data detected previously by the second sensor of the stylus pen, identify an impact to the stylus pen, based on the first pen sensing data, and identify that the specified condition is satisfied upon identifying the impact to the stylus pen.

In an embodiment, the instructions, when executed by the processor, may cause the processor to identify an altitude of the electronic device, based on first sensing data previously sensed by the first sensor of the electronic device, and identify that the specified condition is satisfied, upon identifying that the identified altitude of the electronic device is higher than or equal to a set altitude.

In an embodiment, the instructions, when executed by the processor, may cause the processor to identify that the specified condition is satisfied when a current time elapses by a predetermined calibration time from a time at which a calibration command is transmitted most recently to the stylus pen.

In an embodiment, the instructions, when executed by the processor, may cause the processor to collect the situation information by collecting information indicating whether a current time elapsed a predetermined input time from a time at which a user input is most recently input to the electronic device, and transmit a calibration command to the stylus pen through the communication circuit, based on that the situation information indicates that the current time elapses by the predetermined input time from the time at which the user input is input most recently.

In an embodiment, the instructions, when executed by the processor, may cause the processor to collect the situation information by collecting second sensing data of the first sensor of the electronic device and second pen sensing data of the second sensor of the stylus pen, compare the second sensing data to the second pen sensing data, identify at least one directional axis which requires calibration among a plurality of directional axes identifiable by the second sensor of the stylus pen, based on a result of comparing the second sensing data to the second pen sensing data, and transmit a calibration command for the identified at least one directional axis to the stylus pen through the communication circuit.

In an embodiment, the instructions, when executed by the processor, may cause the processor to identify a state of the electronic device, based on third sensing data detected through the first sensor of the electronic device, in response to determining the identified at least one directional axis indicates a first directional axis, and transmit a calibration command for the identified first directional axis to the stylus pen through the communication circuit, in response to determining the identified state of the electronic device is a stationary state.

In an embodiment, the instructions, when executed by the processor, may cause the processor to identify the state of the electronic device, based on fourth sensing data detected through the first sensor of the electronic device, in response to determining the identified at least one directional axis indicates a second directional axis, and transmit a calibration command for the identified second directional axis to the stylus pen through the communication circuit, in response to determining the state of the electronic device is identified as a moving state.

As described above, a method of operating the electronic device 101 according to an embodiment may include determining whether calibration is required for a second sensor of a stylus pen, based on a specified condition, identifying that the stylus pen is aligned to a specified position of the electronic device, collecting situation information by using a first sensor of the electronic device upon identifying that the stylus pen is aligned to the specified position of the electronic device and upon determining that the calibration is required, and transmitting a calibration command to the stylus pen, based on the situation information.

In an embodiment, the identifying that the stylus pen is aligned to the specified position of the electronic device may include identifying an alignment of the stylus pen, based on that the stylus pen is attached at the specified position of the electronic device.

In an embodiment, the identifying that the stylus pen is aligned to the specified position of the electronic device may include identifying that the stylus pen is attached at the specified position of the electronic device, based on a signal induced to a coil of the electronic device, which produces resonance with a coil of the stylus pen.

In an embodiment, the determining of whether the calibration is required may include receiving, from the stylus pen, first pen sensing data detected previously by the second sensor of the stylus pen, identifying an impact to the stylus pen, based on the first pen sensing data, and identifying that the specified condition is satisfied upon identifying the impact to the stylus pen.

In an embodiment, the determining of whether the calibration is required may include identifying an altitude of the electronic device, based on first sensing data previously sensed by the first sensor of the electronic device, and identifying that the specified condition is satisfied, upon identifying that the identified altitude of the electronic device is higher than or equal to a set altitude.

In an embodiment, the determining of whether the calibration is required may include comparing a current time and a time at which a calibration command is transmitted most recently to the stylus pen, and identifying that the specified condition is satisfied when the comparison result shows that a current time elapses by a predetermined calibration time from a time at which a calibration command is transmitted most recently to the stylus pen.

In an embodiment, the collecting of the situation information may include collecting information indicating whether a current time elapsed a predetermined input time from a time at which a user input to the electronic device is input most recently. The transmitting of the calibration command to the stylus pen, based on the situation information, may include transmitting the calibration command to the stylus pen, based on that the situation information indicates that the current time elapsed the predetermined input time from the time at which the user input is most recently input to the electronic device.

In an embodiment, the collecting of the situation information may include collecting second pen sensing data of the second sensor of the stylus pen and second sensing data of the first sensor of the electronic device. The transmitting of the calibration command to the stylus pen, based on the situation information, may include comparing the second sensing data to the second pen sensing data, identifying at least one directional axis which requires calibration among a plurality of directional axes identifiable by the second sensor of the stylus pen, based on the comparison result for the second sensing data to the second pen sensing data, and transmitting a calibration command for the identified at least one directional axis to the stylus pen.

In an embodiment, the transmitting of the calibration command for the identified at least one directional axis to the stylus pen may include identifying a state of the electronic device, based on third sensing data detected through the first sensor of the electronic device, in response to determining the identified at least one directional axis indicates a first directional axis, and transmitting the calibration command for the identified first directional axis to the stylus pen, in response to determining the state of the electronic device is identified as a stationary state.

In an embodiment, the transmitting of the calibration command for the identified at least one directional axis to the stylus pen may include identifying the state of the electronic device, based on fourth sensing data detected through the second sensor of the electronic device, in response to determining the identified at least one directional axis indicates a second directional axis, and transmitting the calibration command for the identified second directional axis to the stylus pen, in response to determining the state of the electronic device is identified as a moving state.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first sensor;
   a communication circuit;
   a processor; and
   memory storing instructions that, when executed by the processor, cause the electronic device to:
   receive, from a stylus pen, a first pen sensing data detected previously by a second sensor of the stylus pen, wherein the first pen sensing data include information related to an impact to the stylus pen;
   identify whether a specified condition related to the impact to the stylus pen is satisfied, based on the first pen sensing data;
   determine that a calibration is required for the second sensor of the stylus pen, based on the specified condition being satisfied;
   identify whether the stylus pen is inserted into the electronic device;
   in response to identifying that the stylus pen is inserted into the electronic device and determining that the calibration is required, obtain situation information by collecting both a second sensing data of the first sensor of the electronic device and a second pen sensing data of the second sensor of the stylus pen, according to the electronic device in which the stylus pen is inserted being moved;
   compare the second sensing data to the second pen sensing data;
   identify at least one directional axis which requires calibration among a plurality of directional axes identifiable by the second sensor of the stylus pen, based on a result of comparing the second sensing data to the second pen sensing data;
   wherein the plurality of directional axes includes a first directional axis and a second directional axis,
   identify a state of the electronic device, based on third sensing data detected through the first sensor of the electronic device, in response to determining the identified at least one directional axis indicates the first directional axis;
   transmit, through the communication circuit, a calibration command for the identified the first directional axis to the stylus pen, in response to determining the identified state of the electronic device is a stationary state;
   identify a state of the electronic device, based on fourth sensing data detected through the first sensor of the electronic device, in response to determining the identified at least one directional axis indicates the second directional axis; and
   transmit, through the communication circuit, a calibration command for the identified second directional axis to the stylus pen, in response to determining the state of the electronic device is identified as a moving state.

2. The electronic device of claim 1, wherein the instructions, when executed by the processor, cause the electronic device to:
   identify an altitude of the electronic device, based on first sensing data previously sensed by the first sensor of the electronic device; and identify that the specified condition is satisfied, upon identifying that the identified altitude of the electronic device is higher than or equal to a set altitude.

3. The electronic device of claim 1, wherein the instructions, when executed by the processor, cause the electronic device to identify that the specified condition is satisfied when a current time elapses by a predetermined calibration time from a time at which a calibration command is transmitted most recently to the stylus pen.

4. The electronic device of claim 1, wherein the instructions, when executed by the processor, cause the electronic device to:
- obtain the situation information by collecting information indicating whether a current time elapsed a predetermined input time from a time at which a user input is most recently input to the electronic device; and
- transmit, through the communication circuit, a calibration command to the stylus pen, based the situation information indicating that the current time elapsed the predetermined input time from the time at which the user input is most recently input.

5. A method of operating an electronic device, the method comprising:
- receiving, from a stylus pen, a first pen sensing data detected previously by a second sensor of the stylus pen, wherein the first pen sensing data include information related to an impact to the stylus pen;
- identifying whether a specified condition related to the impact to the stylus pen is satisfied, based on the first pen sensing data;
- determining that a calibration is required for the second sensor of the stylus pen, based on the specified condition being satisfied;
- identifying whether the stylus pen is inserted into the electronic device;
- in response to identifying that the stylus pen is inserted into the electronic device and determining that the calibration is required, obtaining situation information by collecting both a second sensing data of a first sensor of the electronic device and a second pen sensing data of the second sensor of the stylus pen, according to the electronic device in which the stylus pen is inserted being moved;
- comparing the second sensing data to the second pen sensing data;
- identifying at least one directional axis which requires calibration among a plurality of directional axes identifiable by the second sensor of the stylus pen, based on a result of comparing the second sensing data to the second pen sensing data;
- wherein the plurality of directional axes includes a first directional axis and a second directional axis,
- identifying a state of the electronic device, based on third sensing data detected through the first sensor of the electronic device, in response to determining the identified at least one directional axis indicates the first directional axis;
- transmitting a calibration command for the identified first directional axis to the stylus pen, in response to determining the identified state of the electronic device is a stationary state;
- identifying a state of the electronic device, based on fourth sensing data detected through the first sensor of the electronic device, in response to determining the identified at least one directional axis indicates the second directional axis; and
- transmitting a calibration command for the identified second directional axis to the stylus pen, in response to determining the state of the electronic device is identified as a moving state.

6. The method of claim 5, wherein the determining of the calibration is required comprises:
- identifying an altitude of the electronic device, based on first sensing data previously sensed by the first sensor of the electronic device; and
- identifying that the specified condition is satisfied, upon identifying that the identified altitude of the electronic device is higher than or equal to a set altitude.

7. The method of claim 5, further comprising identifying that the specified condition is satisfied when a current time elapses by a predetermined calibration time from a time at which a calibration command is transmitted most recently to the stylus pen.

8. The method of claim 5, further comprising:
- obtain the situation information by collecting information indicating whether a current time elapsed a predetermined input time from a time at which a user input is most recently input to the electronic device; and
- transmitting, through a communication circuit, a calibration command to the stylus pen, based the situation information indicating that the current time elapsed the predetermined input time from the time at which the user input is most recently input.

* * * * *

UNITED STATES PATENT AND TRADEMARK OFFICE
CERTIFICATE OF CORRECTION

| | | |
|---|---|---|
| PATENT NO. | : 12,001,619 B2 | Page 1 of 1 |
| APPLICATION NO. | : 17/587786 | |
| DATED | : June 4, 2024 | |
| INVENTOR(S) | : Jung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 16 days.

Signed and Sealed this
Seventh Day of January, 2025

Derrick Brent
*Acting Director of the United States Patent and Trademark Office*